(12) United States Patent
Sugaya et al.

(10) Patent No.: US 11,219,030 B2
(45) Date of Patent: Jan. 4, 2022

(54) WIRELESS COMMUNICATION DEVICE AND WIRELESS COMMUNICATION METHOD

(71) Applicant: SONY CORPORATION, Tokyo (JP)

(72) Inventors: Shigeru Sugaya, Kanagawa (JP); Yuichi Morioka, Kanagawa (JP); Takeshi Itagaki, Saitama (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/077,559

(22) PCT Filed: Jan. 23, 2017

(86) PCT No.: PCT/JP2017/002049
§ 371 (c)(1),
(2) Date: Aug. 13, 2018

(87) PCT Pub. No.: WO2017/154380
PCT Pub. Date: Sep. 14, 2017

(65) Prior Publication Data
US 2019/0037575 A1  Jan. 31, 2019

(30) Foreign Application Priority Data
Mar. 8, 2016 (JP) .............................. JP2016-045018

(51) Int. Cl.
*H04W 72/08* (2009.01)
*H04W 74/08* (2009.01)
(Continued)

(52) U.S. Cl.
CPC .......... *H04W 72/08* (2013.01); *H04B 17/318* (2015.01); *H04B 17/382* (2015.01);
(Continued)

(58) Field of Classification Search
None
See application file for complete search history.

(56) References Cited

U.S. PATENT DOCUMENTS 10,225,806 B2* 3/2019 Oteri ................... H04W 52/243
2007/0133473 A1* 6/2007 Takagi .................. H04W 74/08
370/334
(Continued)

FOREIGN PATENT DOCUMENTS

JP 2007-134905 A 5/2007
JP 2012-15782 A 1/2012
(Continued)

OTHER PUBLICATIONS

International Search Report dated Apr. 11, 2017, in PCT/JP2017/002049 filed Jan. 23, 2017.
(Continued)

*Primary Examiner* — Gregory B Sefcheck
*Assistant Examiner* — Suk Jin Kang
(74) *Attorney, Agent, or Firm* — Xsensus LLP

(57) ABSTRACT

To provide a mechanism capable of improving the efficiency of communications without disturbing other communications, presented herein is a wireless communication device having a reception circuitry that receives a signal and a transmission circuitry that transmits a signal on a basis of a first threshold value set in association with a second threshold value. The first threshold value includes a detection level related to an electric wave in the wireless communication device, and the second threshold value includes a reception determination level of a signal detected by the wireless communication device.

17 Claims, 16 Drawing Sheets

(51) Int. Cl.
  *H04W 16/14*   (2009.01)
  *H04B 17/382*  (2015.01)
  *H04B 17/318*  (2015.01)
  *H04W 52/24*   (2009.01)

(52) U.S. Cl.
  CPC .......... *H04W 16/14* (2013.01); *H04W 74/08* (2013.01); *H04W 52/24* (2013.01)

(56) References Cited

U.S. PATENT DOCUMENTS

| | | | |
|---|---|---|---|
| 2008/0008133 A1* | 1/2008 | Zhu | H04W 72/085 370/332 |
| 2008/0125160 A1* | 5/2008 | Zhu | H04W 52/243 455/522 |
| 2013/0017794 A1* | 1/2013 | Kloper | H04W 74/0808 455/63.1 |
| 2013/0223250 A1* | 8/2013 | Matsuo | H04W 74/0808 370/252 |
| 2013/0235737 A1* | 9/2013 | Merlin | H04W 74/0808 370/252 |
| 2014/0328268 A1* | 11/2014 | Zhu | H04W 74/002 370/329 |
| 2015/0032868 A1* | 1/2015 | Sung | H04L 1/0021 709/221 |
| 2015/0358904 A1* | 12/2015 | Kwon | H04W 24/08 370/252 |
| 2016/0050691 A1* | 2/2016 | Jauh | H04W 74/0808 370/252 |
| 2016/0081010 A1* | 3/2016 | Seok | H04W 74/0808 370/329 |
| 2016/0174079 A1* | 6/2016 | Wang | H04W 16/14 455/454 |
| 2016/0227489 A1* | 8/2016 | Oteri | H04W 52/243 |
| 2016/0262049 A1* | 9/2016 | Shao | H04L 1/00 |
| 2016/0360549 A1* | 12/2016 | Tayamon | H04W 56/0005 |
| 2016/0381688 A1* | 12/2016 | Hedayat | H04L 27/26 370/329 |
| 2017/0055289 A1* | 2/2017 | Chang | H04B 17/318 |
| 2017/0086226 A1* | 3/2017 | Wang | H04W 74/0808 |
| 2017/0105217 A1* | 4/2017 | Kwon | H04W 74/0808 |
| 2017/0118725 A1* | 4/2017 | Chu | H04W 72/0446 |
| 2017/0135133 A1* | 5/2017 | Barriac | H04W 74/0808 |
| 2017/0181189 A1* | 6/2017 | Luo | H04W 74/08 |
| 2017/0208625 A1* | 7/2017 | Choi | H04W 74/006 |
| 2018/0063796 A1* | 3/2018 | Oteri | H04W 74/0808 |
| 2018/0063864 A1* | 3/2018 | Tayamon | H04W 56/0005 |
| 2018/0139635 A1* | 5/2018 | Oteri | H04W 52/34 |
| 2018/0139801 A1* | 5/2018 | Kwon | H04W 84/12 |
| 2018/0167970 A1* | 6/2018 | Yoshimura | H04W 74/006 |
| 2018/0176952 A1* | 6/2018 | Tomeba | H04L 61/6022 |
| 2018/0242222 A1* | 8/2018 | Shinohara | H04L 1/0001 |
| 2018/0242364 A1* | 8/2018 | Park | H04W 74/00 |
| 2018/0248646 A1* | 8/2018 | Wikstrom | H04L 25/00 |
| 2018/0270038 A1* | 9/2018 | Oteri | H04L 5/0073 |
| 2018/0270863 A1* | 9/2018 | Oteri | H04W 74/0816 |
| 2019/0104004 A1* | 4/2019 | Hedayat | H04L 27/26 |
| 2019/0181933 A1* | 6/2019 | Zhang | H04B 7/0617 |
| 2019/0230716 A1* | 7/2019 | Ahn | H04W 72/0413 |
| 2020/0100289 A1* | 3/2020 | Park | H04W 74/00 |
| 2020/0305195 A1* | 9/2020 | Son | H04W 84/12 |
| 2020/0359417 A1* | 11/2020 | Ko | H04W 84/12 |
| 2020/0367280 A1* | 11/2020 | Son | H04W 52/50 |

FOREIGN PATENT DOCUMENTS

| | | |
|---|---|---|
| JP | 2013-183221 A | 9/2013 |
| WO | WO 2013/033692 A1 | 3/2013 |
| WO | WO 2015/003053 A1 | 1/2015 |
| WO | WO 2015/063993 A1 | 5/2015 |
| WO | 2016/023492 A1 | 2/2016 |

OTHER PUBLICATIONS

Extended European Search Report dated Feb. 4, 2019 in European Application No. 17762726.2-1219.

\* cited by examiner

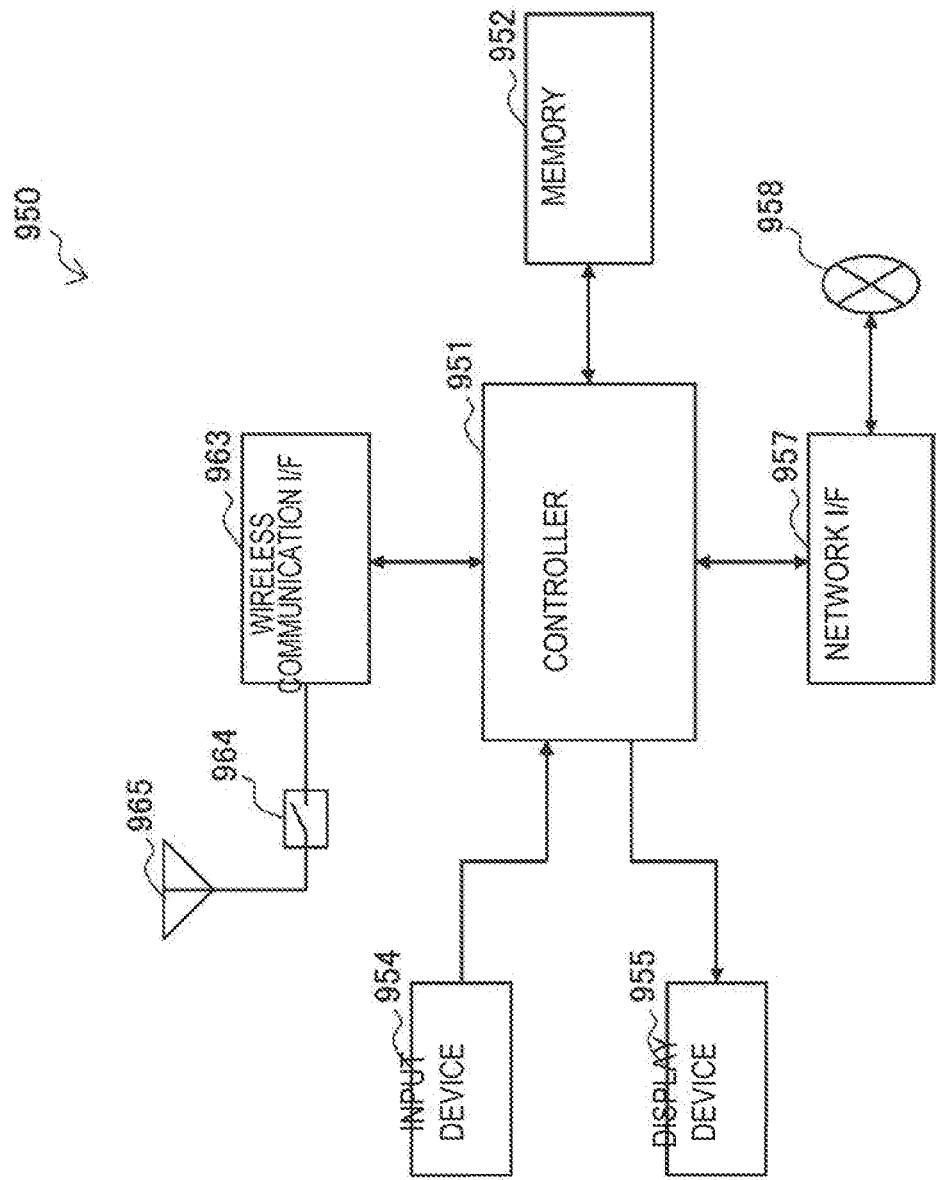

WIRELESS COMMUNICATION DEVICE AND WIRELESS COMMUNICATION METHOD

CROSS-REFERENCE TO RELATED APPLICATIONS

This application is based on PCT Application No. PCT/JP2017/002049 filed on Jan. 23, 2017, which claims priority to Japanese Patent Application No. 2016-045018 filed on Mar. 8, 2016, the entire contents of each are incorporated herein by reference.

TECHNICAL FIELD

The present disclosure relates to wireless communication devices and wireless communication methods.

BACKGROUND ART

In recent years, wireless local area networks (LANs) representative of Institute of Electrical and Electronics Engineers (IEEE) 802.11 have been widely used. In addition, the number of wireless LAN-compatible products (hereinafter, also referred to as wireless communication devices) have also increased in accordance with this. In contrast, wireless communication resources available for communication are limited. Therefore, it is desirable to increase the efficiency of communication between wireless communication devices.

As an example of a technology for improving the efficiency of communication, there is a technology of sharing wireless communication resources with a wireless communication system other than a wireless LAN communication system. For example, there is a technology of performing communication by utilizing a vacant frequency channel when the frequency channel utilized by a television receiver to receive a video is vacant.

For such a technology of sharing wireless communication resources, it is important to avoid crosstalk between the wireless LAN communication system and the different wireless communication system. For example, Patent Literature 1 discloses an invention related to a wireless device configured to determine a running status of the different wireless communication system, and to stop emission of electric waves if it is determined that the different wireless communication system is running.

CITATION LIST

Patent Literature

Patent Literature 1: JP 2012-15782A

DISCLOSURE OF INVENTION

Technical Problem

However, it is desirable to further improve the efficiency of communication. According to the invention disclosed in Patent Literature 1, for example, opportunities for transmission decrease since the emission of electric waves is stopped in a case in which the different wireless communication system running.

Thus, the present disclosure will propose a mechanism capable of improving the efficiency of communication without disturbing other communication.

Solution to Problem

According to the present disclosure, there is provided a wireless communication device including: a reception unit that receives a signal; and a transmission unit that transmits a signal on a basis of a first threshold value set in association with a second threshold value. The first threshold valise includes a detection level related to an electric wave in the wireless communication device, and the second threshold value includes a reception determination level of a signal detected by the wireless communication device, which is set on a basis of transmission power of the wireless communication device.

In addition, according to the present disclosure, there is provided a wireless communication method including, by using a processor: receiving a signal by a wireless communication device; and transmitting a signal on a basis of it first threshold value set in association with a second threshold value. The first threshold value includes a detection level related to an electric wave in the wireless communication device, and the second threshold value includes a reception determination level of a signal detected by the wireless communication device, which is set on a basis of transmission power of the wireless communication device.

Advantageous Effects of Invention

According to the present disclosure, a mechanism capable of causing the efficiency of communication to be improved without disturbing other communication is provided as described above. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 17 is a block diagram illustrating an example of a schematic configuration of a wireless access point.

MODE(S) FOR CARRYING OUT THE INVENTION

Figure 1:
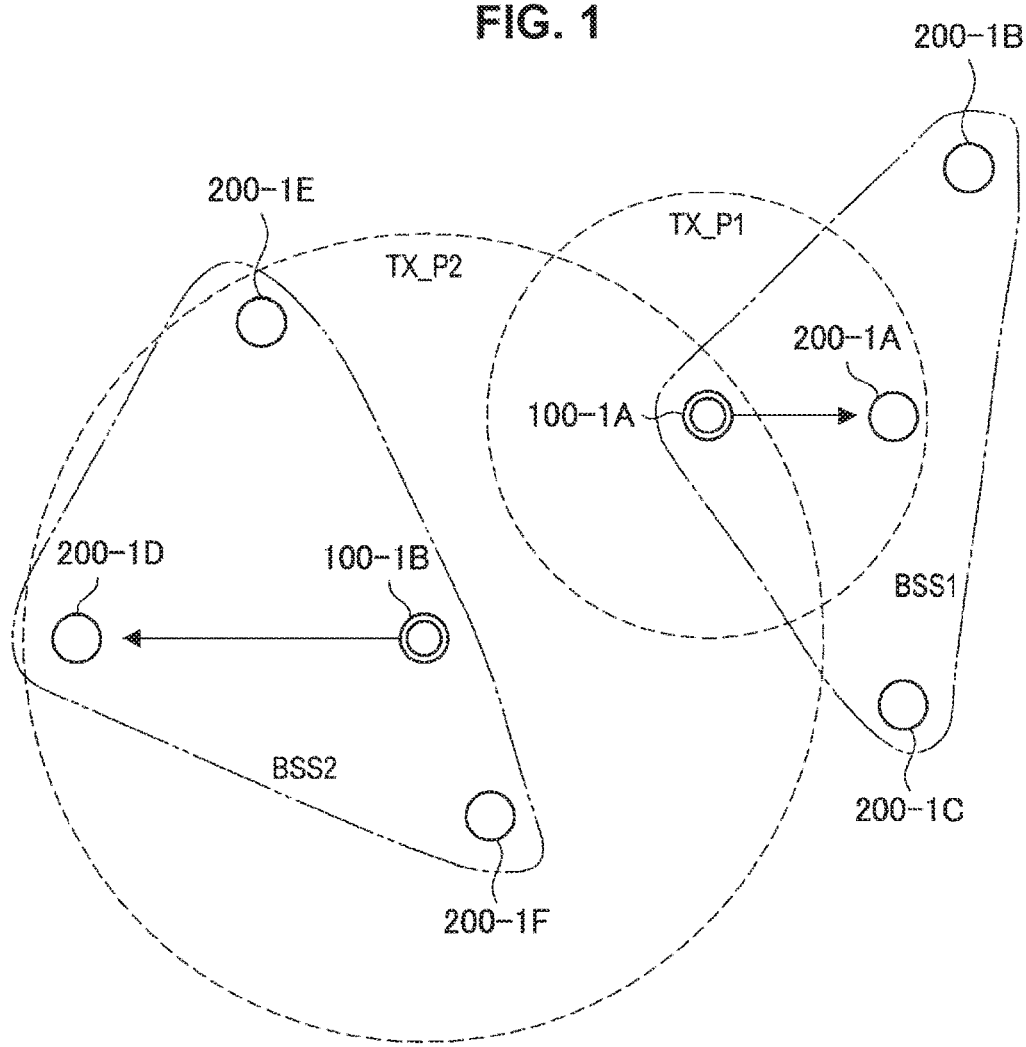
FIG. 1 is a diagram for describing an outline of a wireless communication system according to a first embodiment of the present disclosure.

Hereinafter, (a) preferred: embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this specification and the drawings, there are cases in which a plurality of structural elements having substantially the same function are distinguished by adding different numbers to the end of the same reference numeral. For example, a plurality of structural elements having substantially the same function are distinguished as necessary like an AP 100-1A and an AP 100-1B. However, in a case where it is unnecessary to distinguish structural elements having substantially the same function, only the same reference numeral is added. For example, in a case where it is unnecessary to particularly distinguish the AP 100-1A and the AP 100-1B, they are simply referred to as "APs 100-1."

In addition, wireless communication devices 100 (200) according to first and second embodiments will be distinguished by adding numbers corresponding to the embodiments to the end like wireless communication devices 100-1 (200-1) and wireless communication devices 100-2 (200-2) for convenience of description.

Note that description will be given in the following order.
1. First Embodiment (Vacant Channel Detection Threshold Value in Consideration of OBSS)
1-1. Introduction
1-2. Outline of System
1-3. Basic Configuration of Device
1-4. Detailed Functions of Device
1-5. Processing Performed by Device
1-6. Summary of First Embodiment
1-7. Modification Example
2. Second Embodiment (Vacant Channel Detection Threshold Value in Accordance with Transmission Power)
2-1. Outline of System
2-2. Detailed Functions of Device
2-3. Processing Performed by Device
2-4. Summary of Second Embodiment
2-5. Modification Example
3. Application Example
4. Conclusion 1. First Embodiment (Vacant Channel Detection Threshold Value in Consideration of OBSS)

First, a first embodiment of the present disclosure will be described.

1-1. Introduction

First, technologies related to a wireless communication device according to the first embodiment of the present disclosure will be described.

There are channel access control technologies for avoiding collision of communication for wireless LAN communication. For example, the channel access control technologies include a technology called carrier sense multiple access collision avoidance (CSMA/CA). According to CSMA/CA, it is determined that a channel is in a used state (BUSY state) in a case in which a predetermined preamble added to a signal is detected at predetermined reception field intensity (received signal intensity). Then, if the channel is determined to be the BUSY state, transmission of a signal is suppressed. This is because the channel is being used by another wireless communication device, that is, electric waves are transmitted, in the BUSY state. More specifically, it is determined that the channel is in the BUSY state in a case in which the predetermined preamble is detected at reception field intensity that is equal to or greater than a threshold value called clear channel assessment signal detection (CCA_SD).

Also, there is a technology for controlling transmission power (hereinafter, also referred to as a transmission power control (TPC) technology) for the wireless LAN communication. For example, there is an advanced spatial multiplexing technology of transmitting a signal with transmission power of a lower limit, with which the signal is received by a wireless communication device that is a destination. According to the advanced spatial multiplexing technology, the signal is transmitted with lower transmission power as the wireless communication device that is a destination is located at a closer position. Therefore, it is considered to be possible to cause transmission opportunities for other wireless communication devices to increase.

Further, according to the advanced spatial multiplexing technology, a technology of ignoring signals from adjacent basic service sets (BBS) (hereinafter, also referred to as overlapping BSSs (OBSSs)) other than a BSS to which the wireless communication device itself belongs (hereinafter, also referred to as its own BSS) has been examined. Specifically, in a case in which a signal has been received with reception field intensity that is less than a threshold value called OBSS packet detection (OBSS_PD) from a wireless communication device that belongs to an OBSS, the signal is regarded as not having been received. In this manner, it is considered to be possible to cause transmission opportunities to increase even if the OBSS is present.

However, there is room for improvement in the aforementioned respective technologies.

First, it is difficult to cause the efficiency of channel utilization to be improved according to CSMA/CA. If a preamble with reception field intensity exceeding CCA_SD is detected, transmission of a signal through a channel, in which the preamble has been detected, is suppressed according to CSMA/CA, for example. Therefore, transmission opportunities decrease as wireless communication devices communicating in a communication range increase.

In addition, there is a concern that communication of a wireless communication device itself will be disturbed by communication of other wireless communication devices according to the aforementioned TPC technology. In a case in which a wireless communication device transmits a signal with predetermined transmission power, for example, another wireless communication device transmits a signal with transmission power that is higher than the predetermined transmission power in the surroundings of a wireless communication device that is a destination of the signal in some cases. At this time, there is a concern that it will become difficult for the wireless communication device that is the destination to successfully receive the signal.

Further, there is a concern that collision of communication will increase due to an increase in the transmission opportunities according to the aforementioned advanced spatial multiplexing technology of ignoring signals from OBSSs. For example, setting transmission power to be low by controlling transmission power and raising CCA_SD, which is a fixed value, can be considered. Since the transmission opportunities increase while the signals from OBSSs are ignored in this manner, collision with signals transmitted from wireless communication devices that belong to OBSSs tends to occur due to the increase in the transmission opportunities. As a result, collision of communication increases, and the improvement in the communication efficiency may be impeded.

Thus, a mechanism capable of improving the efficiency of communication without disturbing other communication will be proposed in the first embodiment of the present disclosure.

1-2. Outline of System

The technologies related to the wireless communication device according to the first embodiment of the present disclosure have been described above. Next, an outline of a wireless communication system according to the first embodiment of the present disclosure will be described with reference to FIG. 1. FIG. 1 is a diagram for describing an outline of the wireless communication system according to the first embodiment of the present disclosure.

The wireless communication system according to the embodiment includes wireless communication deuces 100-1 and 200-1 (hereinafter, also referred to as a wireless communication device 100-1 (200-1)) that have a vacant channel detecting function, a TPC function, and an advanced spatial multiplexing function. Specifically, the wireless communication device 100-1 (200-1) performs vacant channel detection processing as in the aforementioned CSMA/CA, and if it is determined that a channel is vacant, the wireless communication device 100-1 (200-1) transmits a signal with transmission power of a lower limit at which the signal is received by a wireless communication device that is a destination of the signal. Also, in a case in which a signal has been received in vacant channel detection processing and the signal is a signal transmitted from a wireless communication device that belongs to an OBSS (hereinafter, also referred to as an OBSS signal), the wireless communication device 100-1 (200-1) regards the signal as not having been received and transmits its own signal.

For example, the wireless communication system according to the embodiment includes an access point (AP) 100-1A and stations (STAs) 200-1A, 200-1B, and 200-1C that belong to a BSS 1, an AP 100-1B, and STAs 200-1D, 200-1E, and 200-1F that belong to a BSS 2, as illustrated in FIG. 1. The AP 100-1A sets transmission power to TX_P1 and transmits a signal with the STA 200-1A as a destination. In addition, the AP 100-1B sets transmission, power to TX_P2 that is higher than TX_P1 and transmits a signal with the STA 200-1D as a destination.

Here, a case in which the AP 100-1B transmits the signal before the AP 100-1A will be considered. In this case, the signal transmitted by the AP 100-1B reaches the AP 100-1A. According to ordinary CSMA/CA, the AP 100-1A waits for its own transmission if reception field intensity for the signal, that is, a preamble, is equal to or greater than CCA_SD. However, according to the embodiment, the AP 100-1A ignores the signal if a transmission source of the signal belongs to an OBSS and reception field intensity of the signal is less than OBSS_PD. Therefore, the AP 100-1A can perform signal transmission regardless of the event in which the has been received from the AP 100-1B.

However, if CCA_SD is uniquely raised in order to further cause transmission opportunities to increase, communication collision as described above may be caused. Thus, according to the embodiment, the wireless communication device 100 (200) sets a threshold value (second threshold value) corresponding to OBSS_PD in accordance with the transmission power and sets a threshold value (first threshold value) corresponding to CCA_SD in association with the second threshold value. Then, the wireless communication device 100 (200) transmits a signal on the basis of the first threshold value.

In this manner, it is possible to set the second threshold value to be larger and also to set the first threshold value to be larger as the transmission power becomes lower, for example. Therefore, it is possible to cause the transmission opportunities to further increase as electric waves further tend not to reach a wireless communication device in the surroundings, that is, as the electric waves tend not to affect the wire communication device in the surroundings. Therefore, it is possible to cause the efficiency of communication to be improved without disturbing other communication.

Note that, although the example in which the wireless communication system includes the AP 100-1 and the STA 200-1 has been described as an example of the wireless communication system in FIG. 1, this may be a wireless communication device in which one of the STAs 100-1 has a plurality of direct links with the other STAs 100-1 instead of the AP 100-1.

1-3. Basic Configuration of Device

Figure 2:
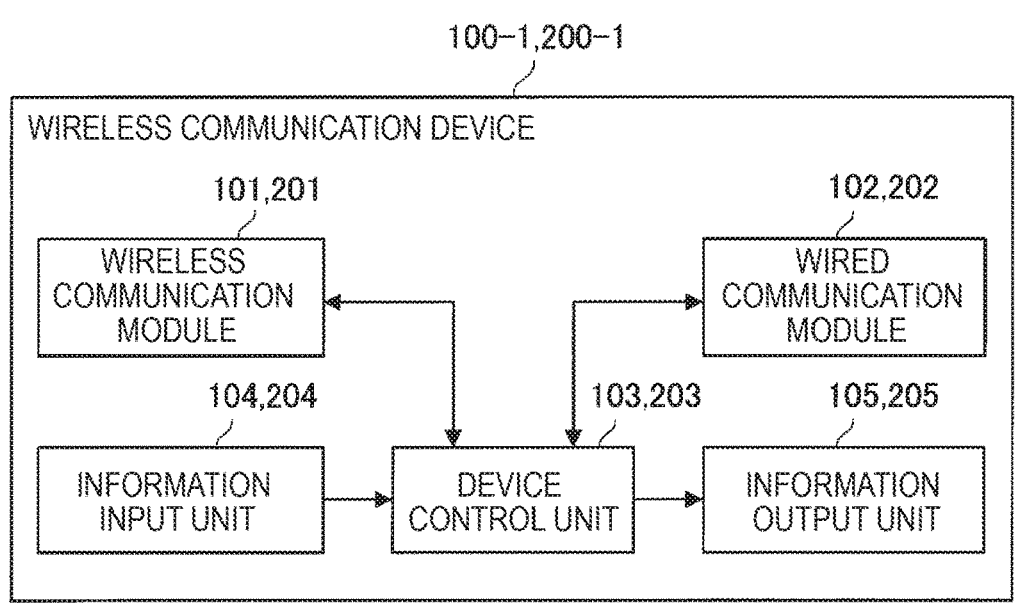
FIG. 2 is a block diagram illustrating an example of a schematic functional configuration of a wireless communication device according to the embodiment.

Next, basic functions of a wireless communication device 100-1 (200-1) according to the embodiment will be described. First, a bask functional configuration of the wireless communication device 100-1 (200-1) according to the embodiment will be described with reference to FIG. 2. FIG. 2 is a block diagram illustrating an example of a schematic functional configuration of the wireless communication device 100-1 (200-1) according to the embodiment.

As illustrated in FIG. 2, a wireless communication device 100-4 (200-1) includes a wireless communication module 101 (201), a wired communication module 102 (202), a device control unit 103 (203), an information input unit 104 (204), and an information output unit 105 (205).

The wireless communication module 101 (201) performs wireless communication with external devices. Specifically, the wireless communication module 101 (201) transmits data obtained from the device control unit 103 (203) and provides received data to the device control unit 103 (203). The details will be described later.

The wired communication module 102 (202) communicates with an external device via wired communication. Specifically, the wired communication module 102 (202) is connected to the Internet and communicates with the external device via the Internet. For example, the wired communication module 102 (202) transmits data acquired via communication by the wireless communication module 101 (201) to the external device via the Internet.

The device control unit 103 (203) controls operation of the wireless communication device 100 (200) in general. Specifically, the device control unit 103 (203) controls communication of the wireless communication module 101 (201) and the wired communication module 102 (202). For example the device control unit 103 (203) causes the wireless communication module 101 (201) or the wired communication module 102 (202) to transmit data obtained from the information input unit 104 (204). Further, the device control unit 103 (203) causes the information output unit 105 (205) to output data obtained by the communication of the wireless communication module 101 (201) or the wired communication module 102 (202).

The information input unit 104 (204) receives an input from the outside of the wireless communication device 100 (200). Specifically, the information input unit 104 (204) receives a user input or information obtained from a sensor. For example, the information input unit 104 (204) is an input device such as a keyboard or a touch panel or a detection device such as a sensor.

The information output unit 105 (205) outputs data. Specifically, the information output unit 105 (205) outputs data instructed from the device control unit 103 (203). For example, the information output unit 105 (205) is a display that outputs images on the basis of image information, a speaker that outputs sounds or music on the basis of audio information, or the like.

Further, the wired communication module 102 (202), the information input unit 104 (204) and the information output unit 105 (205) among the above components may not be included in the wireless communication device 100 (200).
(Configuration of Wireless Communication Module)

Figure 3:
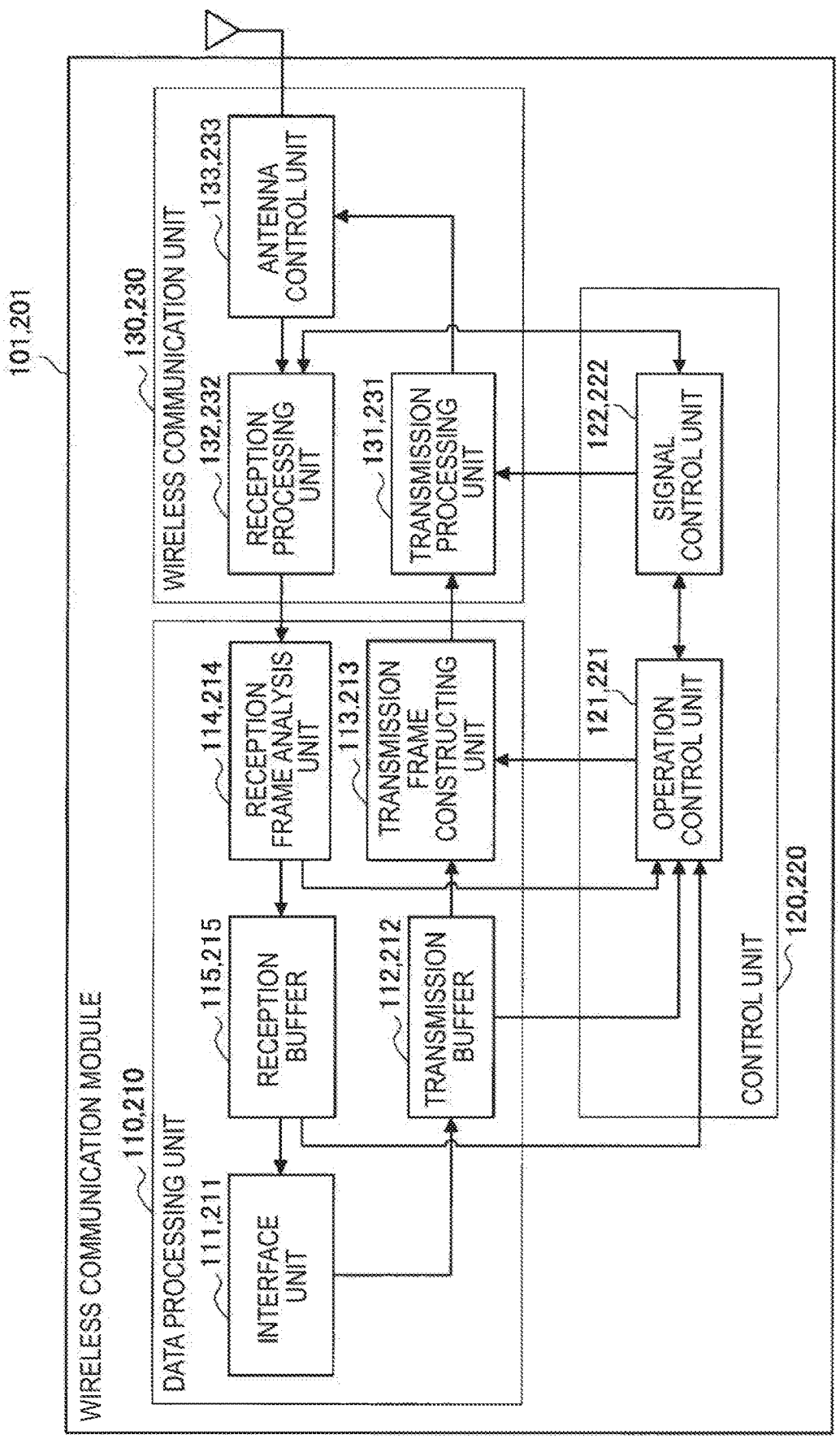
FIG. 3 is a block diagram illustrating an example of a schematic functional configuration of a wireless communication module according to the embodiment.

Next, a functional configuration of the wireless communication module 101 (201) will be described with reference to FIG. 3. FIG. 3 is a block diagram illustrating an example of a schematic functional configuration of the wireless communication module 101 (201) according to a first embodiment of the present disclosure.

As illustrated in FIG. 3, the wireless communication module 101 (201) includes a data processing unit 110 (210), a control unit 120 (220), and a wireless communication unit 130 (230) as a transmission unit and a reception unit.
(1. Data Processing Unit)

The data processing unit 110 (210) includes an interface unit 111 (212), a transmission buffer 112 (212), a transmission frame constructing unit 113 (213), a reception frame analyzing unit 114 (214), and a reception buffer 115 (215) as illustrated in FIG. 3 as parts of the processing unit and an acquisition unit.

The interface unit 111 (211) is an interface connected to other functional components installed in the wireless communication device 100 (200). Specifically, the interface unit 111 performs reception of data that is desired to be transmitted from another functional component, for example, the device control unit 103 (203), provision of reception data to the device control unit 103 (203), or the like.

The transmission buffer 112 (212) stores data to be transmitted. Specifically, the transmission buffer 112 (212) stores data obtained by the interface unit 111 (211).

The transmission frame constructing unit 113 (213) generates a frame to be transmitted. Specifically, the transmission frame constructing unit 113 (213) generates a frame on the basis of data stored in the transmission buffer 112 (212) or control information set by the control unit 120 (220). For example, the transmission frame constructing unit 113 (213) generates a frame (packet) from data acquired from the transmission buffer 112 (212), and performs a process of adding a MAC header for media access control (MAC) and an error detection code to the generated frame and the like.

The reception frame analyzing unit 114 (214) analyzes a received frame. Specifically, the reception frame analyzing unit 114 (214) determines a destination of a frame received by the wireless communication unit 130 (230) and acquires data or control information included in the frame. For example, the reception frame analyzing unit 114 (214) acquires data and the like included in the received frame by performing analysis of the MAC header, detection and correction of a code error, a reordering process, and the like on the received frame.

The reception buffer 115 (215) stores received data. Specifically, the reception buffer 115 (215) stores data acquired by the reception frame analyzing unit 114 (214).
(2. Control Unit)

The control unit 120 (220) includes an operation control unit 121 (221) and a signal control unit 122 (222) as illustrated in FIG. 3 as parts of the processing unit and the acquisition unit.

The operation control unit 121 (221) controls an operation of the data processing unit 110 (210). Specifically, the operation control unit 121 (221) controls the occurrence of communication. For example, if a communication connection request occurs, the operation control unit 121 (221) causes the data processing unit 110 (210) to generate frames related to a connection process or an authentication processing such as an association process or an authentication process.

Further, the operation control unit 121 (221) controls generation of frames on the basis of a storage state of data in the transmission buffer 112 (212), an analysis result for a reception frame, or the like. For example, in a case in which data is stored in the transmission buffer 112 (212), the operation control unit 121 (221) instructs the transmission frame constructing unit 113 (213) to generate a data frame in which the data is stored. Further, in a case in which reception of a frame is confirmed by the reception frame analyzing unit 114 (214), the operation control unit 121 (221) instructs the transmission frame constructing unit 113 (213) to generate an acknowledgment frame which is a response to a received frame.

The signal control unit 122 (222) controls an operation of the wireless communication unit 130 (230). Specifically, the signal control unit 122 (222) controls a transmission/reception process of the wireless communication unit 130 (230). For example, the signal control unit 122 (222) causes the wireless communication unit 130 (230) to set a parameter tor transmission and reception on the basis of an instruction from the operation control unit 121 (221).

As parameters for transmission, there are parameters related to transmission power control and channel access control. For example, a signal control unit 122 (222) manages threshold values of transmission power and reception field intensity such as CCA_SD and OBSS_PD as described above.

In addition, the signal control unit 122 (222) controls vacant channel detection processing as in CSMA/CA as described above. For example, the signal control unit 122 (222) decides to start to transmit a signal or to wait for transmission of the signal on the basis of a result of reception processing performed by a wireless communication unit 130.

(3. Wireless Communication Unit)

As illustrated in FIG. 3, the wireless communication unit 130 (230), as a communication unit, includes a transmission processing unit 131 (231), a reception processing unit 132 (232), and an antenna control unit 133 (233).

The transmission processing unit 131 (231) performs a frame transmission process. Specifically, the transmission processing unit 131 (231) generates a signal to be transmitted on the basis of a frame provided from the transmission frame constructing unit 113 (213). More specifically, the transmission processing unit 131 (231) generates a signal related to a frame on the basis of a parameter set in accordance with an instruction from the signal control unit 122 (222). For example, the transmission processing unit 131 (231) adds a header of a physical layer convergence protocol (PLCP) on the basis of an instruction from a control unit 120 (220). For the frame with the PLCP header added thereto, the transmission processing unit 131 (231) then generates a symbol stream by performing encoding, interleaving, and modulation on the frame provided from the data processing unit 110 (210) in accordance with a coding and modulation scheme instructed by the control unit 120 (220). Further, the transmission processing unit 131 (231) converts the signal related to the symbol stream obtained by the process at the previous stage into an analog signal, and performs amplification, filtering, and frequency up-conversion on the resulting signal.

The reception processing unit 132 (232) performs a frame reception process. Specifically, the reception processing unit 132 (232) restores the frame on the basis of the signal provided from the antenna control unit 133 (233). For example, the reception processing unit 132 (232) acquires a symbol stream by performing a process opposite to the signal transmission, for example, frequency down-conversion, digital signal conversion, and the like on a signal obtained from an antenna. Further, the reception processing unit 132 (232) acquires a frame by performing demodulation, decoding, and the like on the symbol stream obtained by the process at the previous stage and provides the acquired frame to the data processing unit 110 (210) or the control unit 120 (220).

In addition, a reception processing unit 132 (232) performs preamble detection processing. Specifically, the reception processing unit 132 (232) attempts to detect a preamble at a head of a frame, and if the preamble is detected, the reception processing unit 132 (232) performs processing of receiving the aforementioned frame.

In addition, the reception processing unit 132 (232) analyzes a PHY header that is added to a frame. Specifically, if the preamble is detected, the reception processing unit 132 (232) acquires information stored in a PLCP header added to the frame. Note that the acquired information is provided to the control unit 120.

In addition, the reception processing unit 132 (232) measures reception field intensity. Specifically, the reception processing unit 132 (232) measures reception field intensity of electric waves (hereinafter, also referred to as energy). Note that reception field intensity of a signal from another wireless communication system or of electric waves fed from another machine may be measured. For example, the reception field intensity may be a received signal strength indicator (RSSI).

The antenna control unit 133 (233) controls transmission and reception of signals via at least one antenna. Specifically, the antenna control unit 133 (233) transmits the signal generated by the transmission processing unit 131 (231) via the antenna and provides the signal received via the antenna to the reception processing unit 132 (232).

1-4. Detailed Functions of Device

Next, detailed functions of the wireless communication device 100-1 (200-1) according to the embodiment will be described. Note that since the wireless communication devices 100-1 and 200-1 have substantially the same functions, only the wireless communication device 100-1 will be described below.

(A. Setting of Transmission Power)

The wireless communication device 100-1 controls transmission power. Specifically, the control unit 120 controls the transmission power in accordance with a wireless communication device that is a destination of a signal. More specifically, the control unit 120 sets the transmission power on the basis of a communication status with the wireless communication device that is the destination. For example, if the wireless communication device that is the destination of the signal is decided, the control unit 120 acquires information related to past communication with the wireless communication device that is the destination. As the information related to the communication, there is information related to quality or the like of a communication link. Then, the control unit 120 sets the transmission power on the basis of the acquired information related to the past communication.

(B. Setting of OBSS_PD)

Figure 4:
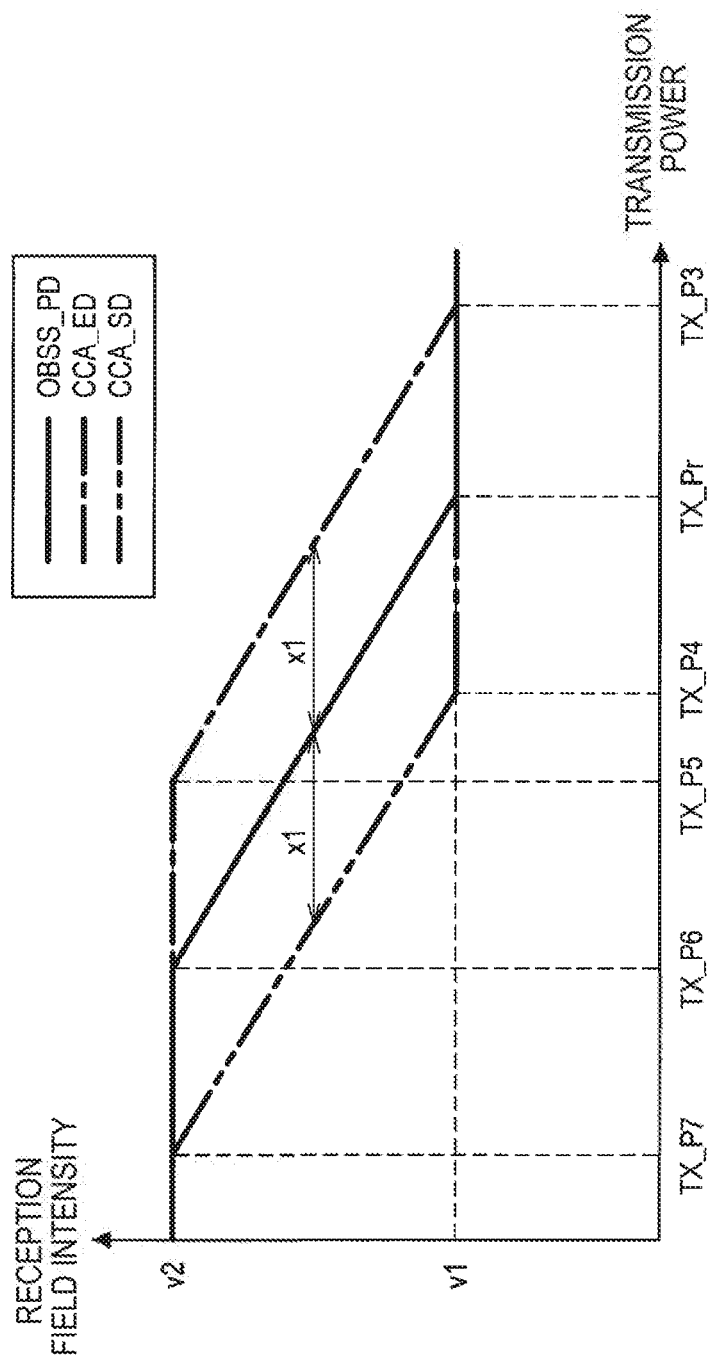
FIG. 4 is a diagram illustrating relationships between the respective threshold values and transmission power set in a lifeless communication device according to the embodiment.

The wireless communication device 100-1 sets a reception determination level (second threshold value) of the detected signal on the basis of the transmission power. Specifically, the second threshold value is a reception determination level of a signal that is transmitted from another wireless communication device (second wireless communication device) that belongs to a second wireless communication network that is different from a first wireless communication network, to which the wireless communication device 100-1 belongs. For example, the control unit 120 sets the reception determination level that is, OBSS_PD, of the signal transmitted from the wireless communication device that belongs to an OBSS of a BSS to which the wireless communication device 100-1 belongs, on the basis of the transmission power. Further, setting of OBSS_PD will be described in detail with reference to FIG. 4. FIG. 4 is a diagram illustrating relationships between the respective threshold values and the transmission power set in the wireless communication device 100-1 according to the embodiment.

The control unit 120 sets OBSS_PD in accordance with how high the transmission power is. In a case in which the transmission power is set to a value between reference transmission power TX_Pr and TX_P6 as illustrated in FIG. 4, for example, the control unit 120 sets OBSS_PD in correlation with the transmission power. Note that, the reference transmission power may be a value corresponding to fixed transmission power in the related art.

In addition, the control unit 120 provides a limit value of OBSS_PD. In a case in which the transmission power is set to be equal to or less than TX_P6 as illustrated in FIG. 4, for example, the control unit 120 sets OBSS_PD to a fixed value v2 that is an upper limit value. In addition, in a case in which the transmission power is set to be equal to or greater than TX_Pr, the control unit 120 sets OBSS_PD to a fixed value v1 as a lower limit value. Note that the fixed value v1 may be a value corresponding to CCA_SD in the related art while the fixed value v2 may be a value corresponding to CCA_ED in the related art.

Note that Equation (1) below may be used for setting OBSS_PD.

[Math. 1]

$$OBSS\_PD = \max\left[\min\left(\begin{array}{c}OBSS\_PD_{min}\\ OBSS\_PD_{max}\\ OBSS\_PD_{min} + (TX\_PWR_{ref} - TX\_PWR)\end{array}\right)\right] \quad (1)$$

$OBSS\_PD_{min}$ represents a lower limit value of OBSS_PD while $OBSS\_PD_{max}$ represents an upper limit value of OBSS_PD. Alternatively, TX_PWR represents transmission power set white $TX\_PWR_{ref}$ corresponds to TX_Pr as described above, that is, the reference transmission power.

(C. Setting of CCA_SD)

The wireless communication device 100-1 sets the detection level (first threshold value) related to electric wines in association with the second threshold value. Specifically the control unit 120 sets, as a first threshold value, a signal detection level at which a signal transported by electric waves is detected in association with the second threshold value. For example, the control unit 120 sets CCA_SD in association with OBSS_PD. Further, setting of CCA_SD will be described in detail with reference to FIG. 4.

The control unit 120 sets CCA_SD that is equal to or less than OBSS_PD. For example, the control unit 120 sets CCA_SD such that CCA_SD is equal to or less than OBSS_PD in the entire range in which the transmission power can be set as illustrated in FIG. 4.

In addition, the control unit 120 causes CCA_SD to change in accordance with a change in OBSS_PD. Specifically, the control unit 120 causes CCA_SD to change such that a difference between CCA_SD and OBSS_PD is fixed relative to a change in the transmission power. In a case in winch the transmission power is set between TX_P4 and TX_P7 as illustrated in FIG. 4, for example, the control unit 120 sets CCA_SD such that CCA_SD changes at the same proportion as the proportion of the change in OBSS_PD in a case in which the transmission power is set between TX_Pr and TX_P6. In addition, in a case in which the transmission power is set between TX_P4 and TX_P6, the control unit 120 causes CCA_SD such that a difference between OBSS_PD and CCA_SD is fixed.

In addition, the control unit 120 causes CCA_SD to start to change with transmission power that is different from transmission power with which the change in OBSS_PD is caused to start. For example, the control unit 120 sets OBSS_PD such that OBSS_PD starts to rise from TX_Pr and stops rising at TX_P6 as illustrated in FIG. 4. In contrast, the control unit 120 sets CCA_SD such that CCA_SD starts to rise from transmission power TX_P4 that is lower than TX_Pr by a coefficient X1 and stops rising at transmission power TX_P7 that is lower than TX_P6 by the coefficient x1.

Note that the difference between OBSS_PD and CCA_SD may be decided on the basis of communication environment information. Specifically, the difference between OBSS_PD and CCA_SD may be decided on the basis of information related to communication errors. For example, the coefficient x1 may be decided on the basis of information about a packet error rale (PER), a bit error late (BER), or the like in past communication. In addition, the difference between OBSS_PD and CCA_SD may be decided on the basis of information that changes in accordance with the number of other wireless communication devices that operate differently from the wireless communication device 100-1. For example, the coefficient x1 may be decided on the basis of the counted number, the density or the like of legacy wireless communication devices that are present in the surroundings of the wireless communication device 100-1.

In addition, the control unit 120 provides limit values of CCA_SD. Specifically the control unit 120 provides an upper limit and a lower limit of CCA_SD such that the upper limit and the lower limit of CCA_SD coincide with an upper limit and a lower limit of OBSS_PD, respectively. As illustrated in FIG. 4, for example, the upper limit of CCA_SD is set to the fixed value v2 that is the upper limit of OBSS_PD while the lower limit of CCA_SD is set to the fixed value v1 that is the lower limit of OBSS_PD.

Note that Equation (2) below may be used for setting CCA_SD.

[Math. 2]

$$CCA\_SD = \max\left[\min\left(\begin{array}{c}OBSS\_PD_{min}\\ OBSS\_PD_{max}\\ OBSS\_PD_{min} + (TX\_PWR_{ref} - TX\_PWR) - x1\end{array}\right)\right] \quad (2)$$

(D. Setting of CCA_ED)

The wireless communication device 100-1 sets a detection level of electric waves as the first threshold value in association with the second threshold value. Specifically the control unit 120 sets CCA energy detection (CCA_ED) in association with OBSS_PD. Further, setting of CCA_ED will be described in detail with reference to FIG. 4.

The control unit 120 sets CCA_ED to be equal to or greater than OBSS_PD. For example, the control unit 120 sets CCA_ED such that CCA_ED is equal to or greater than OBSS_PD in the entire range in which the transmission power can be set as illustrated in FIG. 4.

In addition, the control unit 120 causes CCA_ED to change in accordance with a change in OBSS_PD. Specifically, the control unit 120 causes CCA_ED to change such that the difference between CCA_ED and OBSS_PD is fixed relative to the change in the transmission power. In a case in which the transmission power is set to a value between TX_P3 and TX_P5 as illustrated in FIG. 4, for example, the control unit 120 sets CCA_ED such that CCA_ED changes at the same proportion as the proportion of the change in OBSS_PD in a case in which the transmission power is set between TX_Pr and TX_P6. Also, in the case in which the transmission power is set to a value between TX_Pr and TX_P5, the control unit 120 sets CCA_ED such that the difference between OBSS_PD and CCA_ED is fixed.

In addition, the control unit 120 causes CCA_ED to start to change with transmission power that is different from transmission power with which OBSS_PD starts to change. For example, the control unit 120 sets CCA_ED such that CCA_ED starts to rise from transmission power TX_P3 that is higher than TX_Pr by the coefficient x1 and stops rising at transmission power TX_PR that is higher than TX_P6 by the coefficient x1 as illustrated in FIG. 4.

In addition, the control unit 120 provides limit values of CCA_ED. Specifically, the control unit 120 provides an upper limit and a lower limit of CCA_ED such that the upper limit and the lower limit of CCA_ED coincide with an upper limit and lower limit of OBSS_PD, respectively. As illustrated in FIG. 4, for example, the upper limit of CCA_ED is set to the fixed value v2 that is the upper limit of OBSS_PD while the lower limit of CCA_ED is set to the fixed value v1 that is the lower limit of OBSS_PD.

Note that Equation (3) below may be used for setting CCA_ED.

[Math. 3]

$$CCA\_ED = \max\left[\begin{array}{c} OBSS\_PD_{min} \\ \min\left(\begin{array}{c} OBSS\_PD_{max} \\ OBSS\_PD_{min} + (TX\_PWR_{ref} - TX\_PWR) + x1 \end{array}\right) \end{array}\right] \quad (3)$$

(E. Channel Access Control)

The wireless communication device 100-1 transmits a signal on the basis of the set first threshold value. Specifically, the control unit 120 performs channel access control on the basis of the set threshold value. More specifically, in a case in which electric waves or a signal is detected in a vacant channel checking period, the control unit 120 controls transmission of a signal on the basis of a level and a threshold value of the detected electric waves or signal. Further, channel access control according to the embodiment will be described in detail with reference to FIG. 4.

The control unit 120 sets the vacant channel checking period first when the control unit 120 transmits a signal. For example, if a signal transmission request has occurred, the control unit 120 sets a period such as a distributed coordination function (DCF) inter frame space (DIFS).

In the vacant channel checking period, the control unit 120 determines whether or not an electric wave with reception field intensity of equal to or greater than CCA_ED has been detected. For example, the wireless communication unit 130 determines whether or not reception field intensity of an electric wave that has been detected in a period set as a DIFS is equal to or greater than CCA_ED as illustrated in FIG. 4. If the reception field intensity of the detected electric wave is determined to be equal to or greater than CCA_ED, the control unit 120 regards the channel as being in the BUSY state, causes the wireless communication unit 130 to wait for transmission, and newly sets DIFS after the waiting.

In addition, the control unit 120 determines whether or not a signal has been detected with the reception field intensity of equal to or greater than CCA_SD. For example, if an electric wave is received, the wireless communication unit 130 performs preamble detection processing. Then, if a preamble is detected, the control unit 120 determines whether or not the reception field intensity of the preamble is equal to or greater than CCA_SD as illustrated in FIG. 4. Note that if the reception field intensity of the detected preamble is determined to be less than CCA_SD, the control unit 120 causes the wireless communication unit 130 to transmit a signal.

Figure 5:
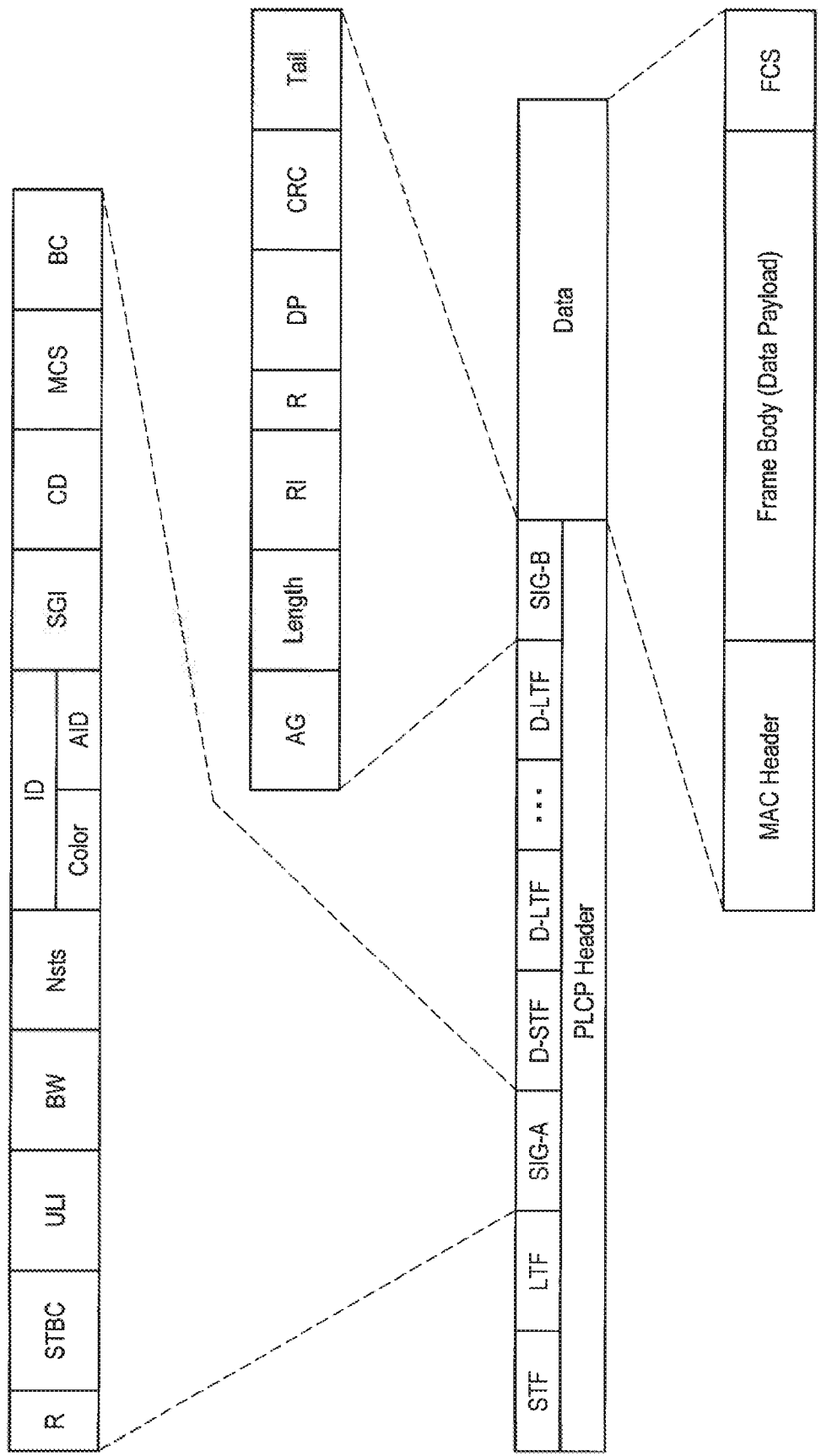
FIG. 5 is a diagram illustrating an example of a configuration of a frame in which information to be used for OBSS signal determination processing in the wireless communication device is stored according to the embodiment.
Figure 6:
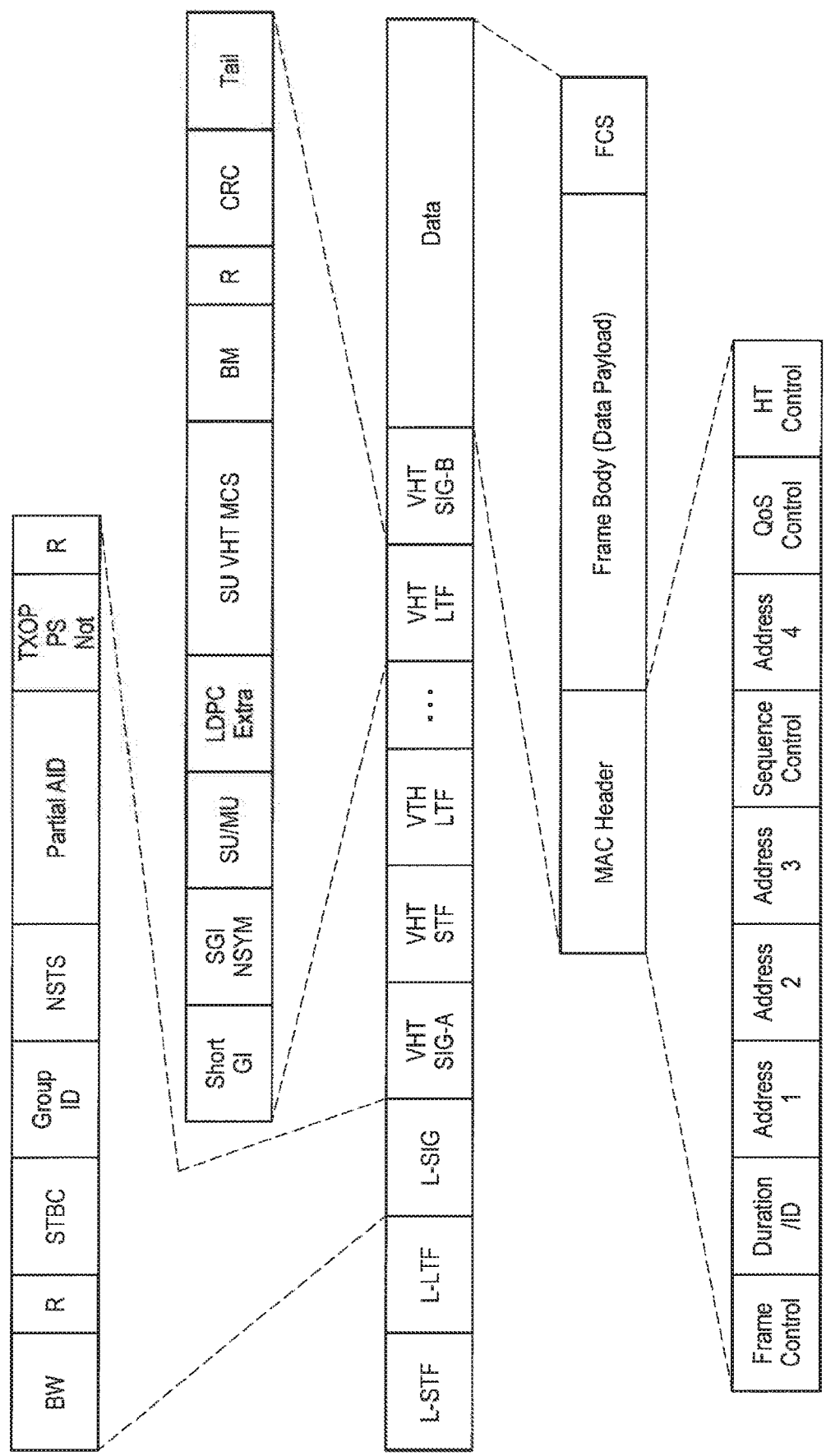
FIG. 6 is a diagram illustrating another example of a configuration of a frame in which information used for the OBSS signal determination processing in the wireless communication device is stored according to the embodiment.

If the signal has been detected with the reception field intensity of equal to or greater than CCA_SD, the control unit 120 determines whether or not the signal is a signal that has been transmitted from a wireless communication device that belongs to an OBSS. In a case in which the reception field intensity of the detected preamble is equal to or greater than CCA_SD, for example, the wireless communication unit 130 receives a header of a signal with the preamble added thereto and acquires information stored in the received header. Then, the control unit 120 determines whether or not the signal is an OBSS signal on the basis of the acquired information. Further, OBSS signal determination processing based on the information stored in the header of the signal will be described in detail with reference to FIGS. 5 and 6. FIG. 5 is a diagram illustrating an example of a configuration of a frame in which information used in the OBSS signal determination processing performed by the wireless communication device 100-1 is stored according to the embodiment. FIG. 6 is a diagram illustrating another example of a configuration of a frame in which information used in the OBSS signal determination processing performed by the wireless communication device 100-1 is stored according to the embodiment.

The information used in the OBSS signal determination processing is stored in the PLCP header of the frame. For example, the frame includes the PCLP header and data, and the PCLP header has fields such as Short Training Field (STF), Long Training Field (LTF), Signaling-A (SIG-A), D-STF, D-LTF, and SIG-B. Further, the SIG-A field has fields such as Reserved, Space Time Block Coding (STBC), Uplink Indication (ULI), Bandwidth (BW), Nsts, identifier (ID) Short GI (SGI). Coding (CD), Modulation and Coding Set (MCS), and Beam Channel (BC)/Smoothing. The ID field has fields such as Color and Association ID (AID). Color information and AID stored for each BSS are stored as information for determining an OBSS signal in the ID field. The control unit 120 determines whether or not a BSS to which a transmission source of a received signal belongs is different from its own BSS by using the Color information or AID.

In addition, the information used for the OBSS signal determination processing is stored in a MAC header of a frame. For example, the frame includes a PHY header and Data, and Data has fields such as MAC Header, Frame Body (Data Payload), and Frame Check Sequence (FCS). Further, the MAC Header field has fields such as Frame Control, Duration/ID, Address1 to Address4, Sequence Control, Quality of Service (QoS), Control, and High Throughput (HT) Control. Address information with which its own BSS is identified is stored as information for determining an OBSS signal in the Address 1 to Address4 fields. The control unit 120 determines whether or not a BBS to which the transmission source of the received signal belongs to is different from its own BSS by using the address information.

If it is determined that the received signal is an OBSS signal, the control unit 120 determines whether or reception field intensity of the signal is less than OBSS_PD. For example, the control unit 120 determines whether or not the reception field intensity of the signal that has been determined to be an OBSS signal is less than OBSS_PD as illustrated in FIG. 4. If the reception field intensity of the received signal is determined to be less than OBSS_PD, the control unit 120 regards no signal as having been received and causes the wireless communication unit 130 to transmit a signal.

In a case in which the reception field intensity of the received signal is determined to be equal to or greater OBSS_PD, or in a case in which the received signal is determined not to be a signal that has been transmitted from the wireless communication device that belongs to the OBSS, the control unit 120 causes the wireless communication unit 130 to wait for transmission of the signal. For example, the control unit 120 sets a network allocation vector (NAV) period on the basis of a period up to the end of the received signal, information stored in the Duration/ID field of the MAC header, or the like and waits for transmission until the NAV period has elapsed.

Hereinafter, behaviors of the wireless communication device 100-1 in the aforementioned channel access control will be summarized.

1. In a case in which a signal has been detected with the reception field intensity of less than CCA_SD, a signal is transmitted.
2. In a case in which an OBSS signal has been detected with the reception field intensity of equal to or greater than CCA_SD and less than OBSS_PD, a signal is transmitted.
3. In a case in which a signal that has been transmitted from a wireless communication device that belongs to its own BSS (hereinafter, also referred to as its own BSS signal) has been detected with the reception field intensity of equal to or greater than CCA_SD and less than OBSS_PD, signal transmission is suppressed.
4. In a case in which a signal has been detected with the reception field intensity of equal to or greater than OBSS_PD, signal transmission is suppressed.
5. In a case in which an electric wave has been detected with the reception field intensity of less than CCA_ED, a signal is transmitted.
6. In a case in which an electric wave has been detected with the reception field intensity of equal to or greater than CCA_ED, signal transmission is suppressed.

1-5. Processing Performed by Device

Next, processing performed by the wireless communication device according to the embodiment will be described.
(Overall Processing)

Figure 7:
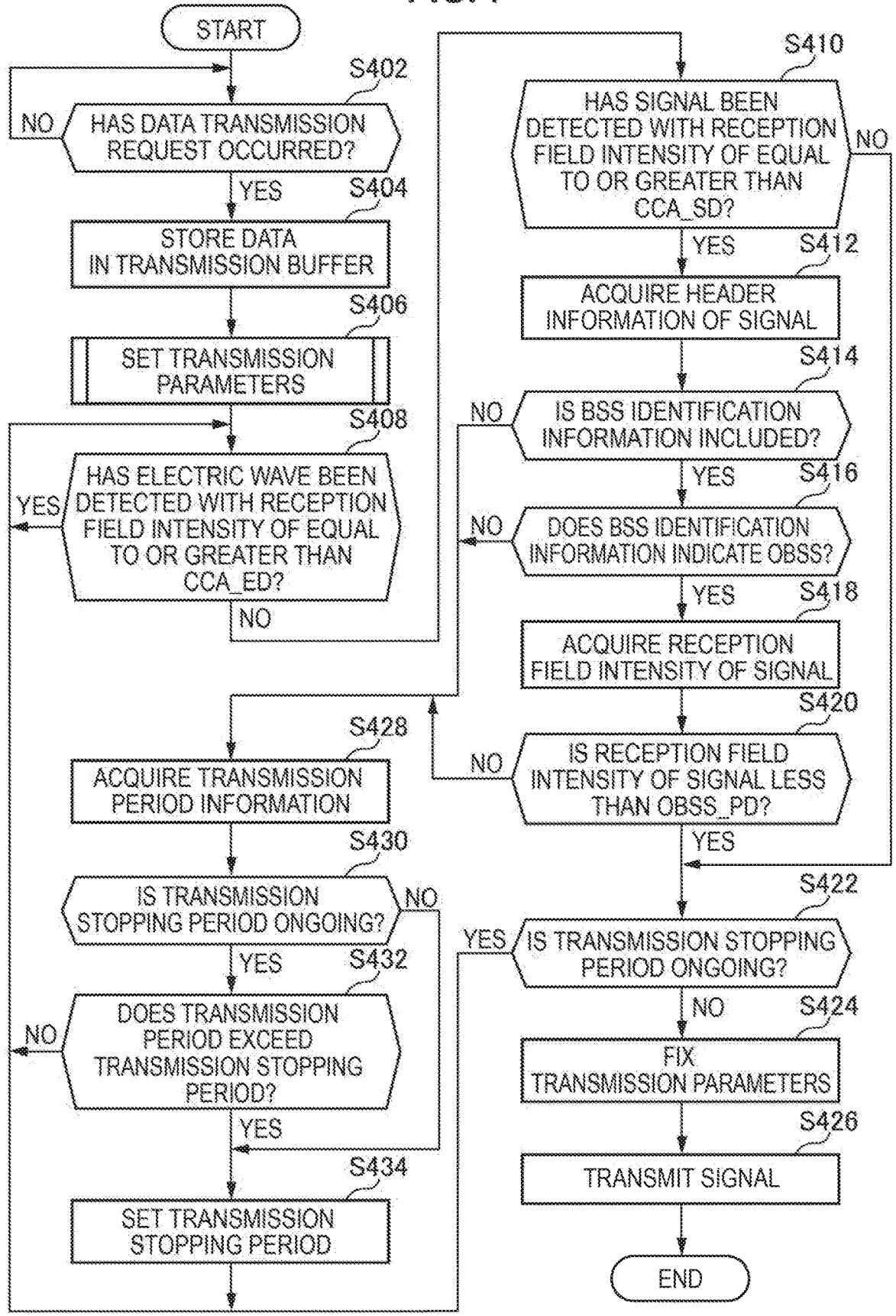
FIG. 7 is a flowchart conceptually illustrating an example of overall processing performed by the wireless communication device according to the embodiment.

First, overall processing performed by the wireless communication device 100-1 will be described with reference to FIG. 7. FIG. 7 is a flowchart conceptually illustrating an example of overall processing performed by the wireless communication device 100-1 according to the embodiment.

The wireless communication device 100-1 determines whether or not a data transmission request has occurred (Step 402). Specifically, the data processing unit 110 determines whether or not data, transmission of which is requested, has been received via an interface unit 111.

If it is determined that the data transmission request has occurred, the wireless communication device 100-1 stories the data in a transmission buffer 112 (Step 404). Specifically, if the data is received via the interface unit 111, the data processing unit 110 stores the data in the transmission buffer 112.

Next, the wireless communication device 100-1 sets transmission parameters (Step 406). Specifically, if the data is stored in the transmission buffer 112, the control unit 120 sets transmission parameters such as threshold values or the like related to the transmission power for transmitting the data or channel access control. Note that details thereof will be described later.

Next, the wireless communication device 100-1 determines whether or not an electric wave has been detected with the reception field intensity of equal to or greater than CCA_ED (Step S408). Specifically, the wireless communication unit 130 measures the reception field intensity of an electric wave that has reached an antenna. Then, the wireless communication unit 130 determines whether or not the reception field intensity of the detected electric wave is equal to or greater than CCA_ED.

If it is determined that the electric wave has not been detected with the reception field intensity of equal to or greater than CCA_ED, the wireless communication device 100-1 determines whether or not a signal has been detected with the reception field intensity of equal to or greater than CCA_SD (Step S410). Specifically, if an electric wave has reached, the wireless communication unit 130 attempts to detect a preamble. If the preamble is detected, the wireless communication unit 130 determines whether the reception field intensity of the preamble is equal to or greater than CCA_SD.

If it is determined that the signal has been detected with the reception field intensity of equal to or greater than CCA_SD, the wireless communication device 100-1 acquires header information of the signal (Step S412). Specifically, if it is determined that the reception field intensity of the preamble is equal to or greater than CCA_SD, the wireless communication unit 130 receives a part following the preamble and acquires the header information. Note that in a case in which the header information is MAC header information, the data processing unit 110 acquires the header information.

Next, the wireless communication device 100-1 determines whether or not BSS identification information is included in the acquired header information (Step S414). Specifically, the control unit 120 determines whether or not information that is used for OBSS signal determination processing, for example, Color information, AID, address information, or the like is included in the acquired header information.

If it is determined that the BSS identification information is included in the header information, the wireless communication deuce 100-1 determines whether or not the BSS identification information indicates an OBSS (Step S416). Specifically, in a case in which it is determined that the information used for the OBSS signal determination processing is included in the header information, the control unit 120 determines whether or not a BSS indicated by the information used for the OBSS signal determination processing is different from its own BSS.

If it is determined that the BSS identification information indicates an OBSS, the wireless communication device 100-1 acquires the reception field intensity of the signal (Step S418). Specifically, if it is determined that the BSS indicated by the information used for the OBSS signal determination processing is different from its own BSS, the control unit 120 acquires information indicating the reception field intensity measured by the wireless communication unit 130.

Next, the wireless communication device 100-1 determines, whether or not the reception field intensity of the signal is less than OBSS_PD (Step S420). Specifically, the control unit 120 determines whether or not the reception field intensity indicated by the acquired information is less than OBSS_PD.

If it is determined that the reception field intensity of the signal is less than OBSS_PD, the wireless communication device 100-1 determines whether or not a transmission stopping period is ongoing (Step S422). Specifically, if it is determined that the reception field intensity is less than OBSS_PD, the control unit 120 determines whether or not a NAV period has been set.

If it is determined that the transmission stopping period is not ongoing, the wireless communication device 100-1 fixes the transmission parameters (Step S424). Specifically, if it is determined that the NAV period has not been set, the control unit 120 fixes the transmission parameters such as the transmission power, the MCS, and the like.

Next, the wireless communication device 100-1 transmits a signal (Step S426). Specifically, the wireless communication unit 130 transmits a signal with the transmission parameters fixed by the control unit 120.

If it is determined that the BSS identification information is not included in the header information in Step S414, the wireless communication device 100-1 acquires transmission period information (Step S428). Specifically, the wireless communication unit 130 or the data processing unit 110 acquires transmission period information from the header information.

Next, the wireless communication device 100-1 determines whether or not the transmission stopping period is ongoing (Step S430). Specifically, the control unit 120 determines whether or not the NAV period has been set.

If it is determined that the transmission stopping period is ongoing, the wireless communication device 100-1 determines whether or not the transmission period exceeds the transmission stopping period (Step S432). Specifically, the control unit 120 determines whether or not the transmission period of the signal, which is indicated by the acquired transmission period information, exceeds the NAV period.

In a case in which it is determined that the transmission period exceeds the transmission stopping period, the wireless communication device 100-1 sets the transmission stopping period (Step S434). Specifically, if it is determined that the transmission period indicated by the transmission period information exceeds the NAV period, the control unit 12 updates the NAV period up to a time at which the transmission period ends. Note that in a case in which the NAV period has not been set, the NAV period is newly set on the basis of the transmission period information.

(Transmission Parameter Setting Processing)

Figure 8:
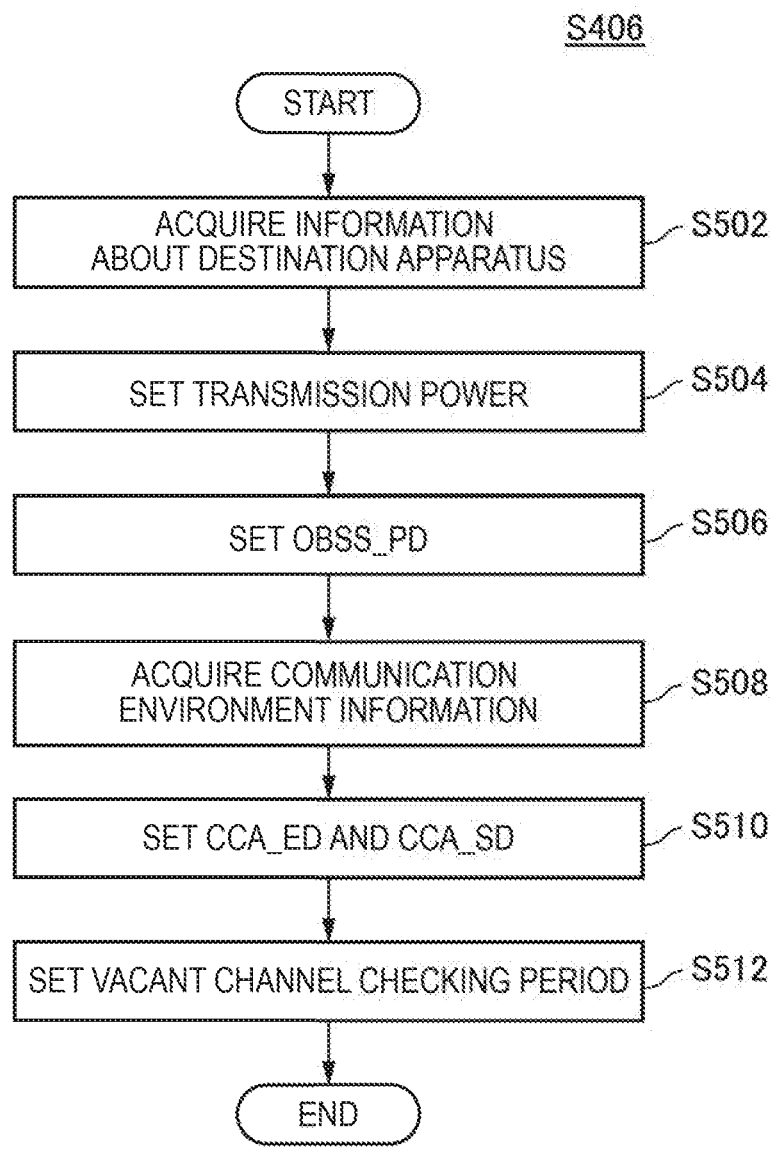
FIG. 8 is a flowchart conceptually illustrating an example of processing of setting transmission parameters, which is performed by the wireless communication device according to the embodiment.

Next, transmission parameter setting processing performed by the wireless communication device 100-1 will be described with reference to FIG. 8. FIG. 8 is a flowchart conceptually illustrating an example of the transmission parameter setting processing performed by the wireless communication device 100-1 according to the embodiment.

The wireless communication device 100-1 acquires information about a wireless communication device that is a destination (Step S502). Specifically, the control unit 120 acquires information related to communication with the wireless communication device that is the destination of a signal or data in the past, for example, communication link quality information or the like.

Next, the wireless communication device 100-1 sets transmission power on the basis of the information about the wireless communication device that is the destination (Step S504). Specifically, the control unit 120 calculates transmission power at a lower limit in a range in which the signal reaches the wireless communication device that is the destination, from acquired information related to communication in the past.

Next, the wireless communication device 100-1 sets OBSS_PD on the basis of the transmission power (Step S506). Specifically, the control unit 120 sets OBSS_PD on the basis of the calculated transmission power and Equation (1) described above.

Next, the wireless communication device 100-1 acquires communication environment information (Step S508). Specifically, the control unit 120 calculates communication errors or the number of legacy devices on the basis of the communication result in the past.

Next, the wireless communication device 100-1 sets CCA_ED and CCA_SD on the basis of OBSS_PD (Step S510). Specifically, the control unit 120 calculates the aforementioned coefficient x1 by using the calculated communication errors or the number of legacy devices. Then, the control unit 120 respectively sets CCA_SD and CCA_ED on the basis of OBSS_PD, the coefficient x1, and Equations (2) and (3) described above.

Next, the wireless communication device 100-1 sets a vacant channel checking period (Step S512). Specifically; the control unit 120 sets a period for determining vacancy of a channel such as a DIFS.

1-6. Summary of First Embodiment

According to the first embodiment of the present disclosure, the wireless communication device 100-1 (200-1) receives a signal and transmits a signal on the basis of the first threshold value set in relation to the second threshold value as described above. In addition, the first threshold value includes a detection level related to electric waves in the wireless communication device 100-1 (200-1), and the second threshold value includes a reception determination level of a signal detected by the wireless communication device 100-1 (200-1) which is set on the basis of the transmission power of the wireless communication device 100-1 (200-1).

Therefore, it is possible to control how easy the signal or the electric waves can be detected in accordance with how easy the signal can be received, by the detection level used for controlling whether or not the signal is to be transmitted being set in association with the reception determination level that varies in accordance with the transmission power. For example, it is possible not only to make it easy to receive a signal but also to make it easy to detect the signal or the electric waves as the transmission power becomes higher. In this manner, it is possible to suppress the concern that the transmission opportunities are caused to decrease as the transmission power becomes higher and other communication is disturbed by a signal transmitted by the wireless communication device 100-1 (200-1). In addition, it is possible not only to make it difficult to receive a signal but also to make it difficult to detect the signal or the electric waves as the transmission power becomes lower. In this manner, the transmission opportunities are caused to increase as the transmission power becomes lower, and it is possible to improve the efficiency of the communication performed by the wireless communication device 100-1 (200-1). Therefore, it is possible to cause the efficiency of the communication to be improved without disturbing other communication. Further, it is possible to simplify the processing related to the setting of the detection level by the detection level of the signal or the electric waves being controlled in association with the reception determination level. The processing of setting CCA_SD or CCA_ED is simplified by CCA_SD or CCA_ED being caused to change with a trend that is similar to that of OBSS_PD, for example (by using the aforementioned coefficient x1, for example). Therefore, it is possible to simplify a signal or electric wave detection circuit.

In addition, the aforementioned second threshold value includes the reception determination level of the signal transmitted from the second wireless communication device that belongs to the second wireless communication network that is different from the first wireless communication network to which the wireless communication device 100-1 (200-1) belongs. Here, the OBSS signal generally tends not to disturb communication as compared with its own BSS signal. Therefore, it is possible to regard no signal as having been detected in a case in which the reception field intensity is less than OBSS_PD even if the reception field intensity is equal to or greater than CCA_SD, for example, by whether or not a signal has been detected varying in accordance with whether or not the received signal is an OBSS signal. Therefore, it is possible to cause both effects of suppressing disturbance of communication performed by other wireless communication devices and of improving the communication efficiency to be improved.

In addition, the aforementioned transmission power is controlled in accordance with the wireless communication as the destination of the signal. Therefore, it is possible to set the transmission power to transmission power of the lower limit in the range in which communication with the wireless communication device that is the destination is successfully made. Therefore, it is possible to further suppress disturbance of other communication. In addition, it is possible to save power of the wireless communication device 100-1 (200-1).

In addition, the aforementioned first threshold value includes a threshold value that changes in accordance with a change in the aforementioned second threshold value. Therefore, it is possible to increase a relevance between the first threshold value and the transmission power by the first threshold value changing in accordance with the second threshold value that changes on the basis of the transmission power. Therefore, it is possible to effectively cause the communication efficiency to be improved.

In addition, the aforementioned first threshold value includes such a threshold value that the difference between the aforementioned first threshold value and the aforementioned second threshold value is fixed relative to a change in transmission power. Therefore, it is possible to secure a predetermined amount of increase in the transmission opportunities regardless of the transmission power. Therefore, it is possible to more reliably improve the communication efficiency.

In addition, the aforementioned first threshold value includes a threshold value that starts to change with the aforementioned transmission power that is different from the aforementioned transmission power with which the aforementioned second threshold value starts to change. Therefore, it is possible to more reliably set the difference between the first threshold value and the second threshold value. Further, it is possible to increase a degree of increase in the transmission opportunities by causing the second threshold value to start to change before the first threshold value in accordance with the decrease in the transmission power.

In addition, the difference between the aforementioned first threshold value and the aforementioned second threshold value is decided on the basis of the communication environment information. Therefore, it is possible to balance between the improvement in the efficiency of its own communication and the increase in communication collision by causing the transmission opportunities to increase. Therefore, it is possible to cause the communication efficiency of the entire wireless communication system to be improved.

In addition, the aforementioned communication environment information includes information that changes in accordance with the information related to communication errors or the number of other wireless communication devices that operate differently from the wireless communication device 100-1 (200-1). Therefore, it is possible to control the degree of increase in the transmission opportunities in accordance with a rate of occurrence of communication errors, the number of legacy devices in the surroundings of the wireless communication device 100-1 (200-1), or the like. Therefore, it is possible to cause the transmission opportunities to increase to such a degree that is more suitable for the communication environment and to more effectively cause the communication efficiency to be improved.

In addition, the upper hunt and the lower limit of the aforementioned first threshold value coincides the upper limit and the lower limit of the aforementioned second threshold value, respectively. Therefore, it is possible to prevent the transmission opportunities from excessively varying by the upper limit and the lower limit being provided. Also, it is possible to perform the same signal transmission control on both its own BSS signal and the OBSS signal at the upper limit and the lower limit by the upper limit and the lower limit of the first threshold value coinciding with those of the second threshold value. Since the transmission power becomes relatively high at the lower limit, in particular, there is a concern that communication performed by the wireless communication device that belongs to an OBSS is unilaterally disturbed if the lower limit of the second threshold value is higher than the lower limit of the first threshold value, for example. In contrast, it is possible to suppress the communication performed by the wireless communication device that belongs to the OBSS from being unilaterally disturbed by the lower limits coinciding with each other.

In addition, the aforementioned first threshold value includes a detection level of electric waves. Therefore, it is possible to detect electric waves in accordance with the transmission power by CCA_ED being set in association with OBSS_PD set on the basis of the transmission power.

In addition, the aforementioned detection level of live electric waves includes a value that is equal to or greater than the aforementioned second threshold value. Therefore, in a case in which the reception field intensity of the OBSS signal is equal to or greater than CCA_ED, it is possible to move on to a transmission waiting state without receiving the OBSS signal. Therefore, it is possible to reduce a burden of the communication processing.

In addition, the aforementioned first threshold value includes a signal detection level at which the signal transported by electric waves is detected. Therefore, it is possible to detect the signal in accordance with the transmission power by CCA_SD being set in association with OBSS_PD set on the basis of the transmission power.

In addition, the aforementioned signal detection level includes a value that is equal to or less than the aforementioned second threshold value. Therefore, in a case in which the reception field intensity of the OBSS signal is less than CCA_SD, it is possible to perform its own transmission without performing the OBSS signal determination processing. Therefore, it is possible to reduce the burden of the Communication processing.

In addition, in a case in which the reception field intensity is equal to or greater than the signal detection level at which the signal transported by electric waves is detected and is less than the aforementioned reception determination level, the wireless communication device 100-1 (200-1) transmits a signal. Therefore, it is possible to perform its own transmission as long as the reception field intensity is less than OBSS_PD even if the OBSS signal has been received with the reception field intensity of equal to or greater than CCA_SD. Therefore, it is possible to increase the transmission opportunities.

1-7. Modification Example

The first embodiment of the present disclosure has been described above. Note that the embodiment is not limited to the aforementioned example. Hereinafter, a modification example of the embodiment will be described.

Figure 9:
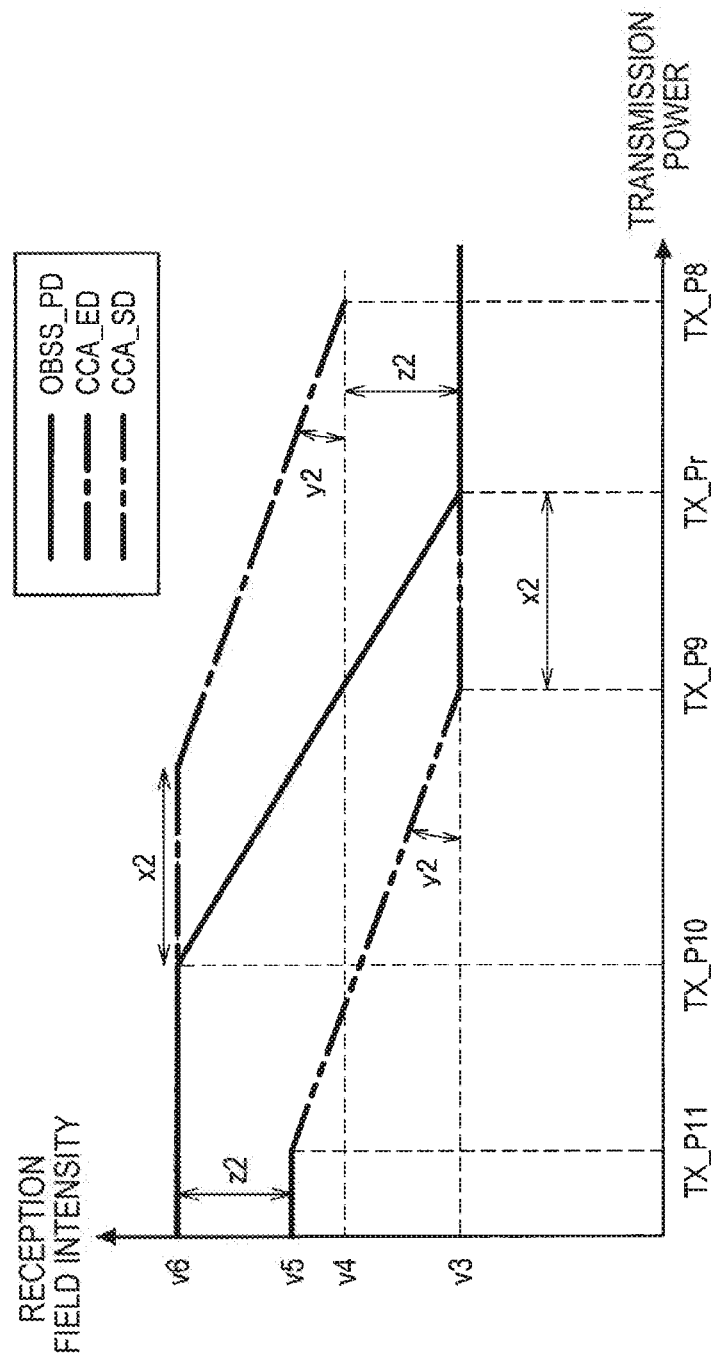
FIG. 9 is a diagram illustrating relationships between the respective threshold values and transmission power set in a wireless communication device according to a modification example of the embodiment.

In a modification example of the embodiment, the first threshold value may be such a value that a difference between the first threshold value and the second threshold value is variable relative to a change in the transmission power. Specifically the first threshold changes at a proportion that is different from that of a change in the second threshold value. For example, the control unit 120 causes CCA_SD and CCA_ED to change relative to the change in the transmission power at a proportion that is different from that of a change in OBSS_PD. Further, processing according to the modification example will be described in detail with reference to FIG. 9. FIG. 9 is a diagram illustrating relationships between the respective threshold values and the transmission power set in the wireless communication device 100-1 according to the modification example of the embodiment.

The control unit 120 causes CCA_SD to change such that the difference between CCA_SD and OBSS_PD is variable relative to the change in the transmission power. In a case in which the transmission power is set to a value between TX_P9 to TX_P11 as illustrated in FIG. 9, for example, the control unit 120 sets CCA_SD such that CCA_SD changes at a proportion that is different from the proportion of the change in OBSS_PD in a case in which the transmission power is set between TX_Pr and TX_P10. The proportion of the change in CCA_SD is managed by a coefficient y2.

The control unit 120 provides the upper limit and the lower limit of CCA_SD such that at least one of the upper limit and the lower limit of CCA_SD differs from at least one of the upper limit and the lower limit of OBS_PD, respectively. The upper limit of CCA_SD is set to a fixed value v5 that, is different from a fixed value v6 that is the upper limit of OBSS_PD as illustrated in FIG. 9, for example. The difference between the fixed values V5 and V6 is managed, by a coefficient z2.

Note that Equation (4) as described below may be used for setting CCA_SD.

[Math. 4]

$$CCA\_SD = \max\left[\min\left(\begin{array}{c}OBSS\_PD_{min}\\OBSS\_PD_{max} - z2\\OBSS\_PD_{min} + y2(TX\_PWR_{ref} - TX\_PWR - x2)\end{array}\right)\right] \quad (4)$$

In addition, setting similar to that for CCA_SD as described above may also be set for CCA_ED. In that case, Equation (5) as described below may be used for setting CCA_ED.

[Math. 5]

$$CCA\_ED = \max\left[\min\left(\begin{array}{c}OBSS\_PD_{min} + z2\\OBSS\_PD_{max}\\OBSS\_PD_{min} + y2(TX\_PWR_{ref} - TX\_PWR + x2)\end{array}\right)\right] \quad (5)$$

According to the modification example of the embodiment, the first threshold value includes such the threshold value that the difference between the first threshold value and the second threshold value is variable relative to the change in the transmission power as described above. Therefore, it is possible to change a degree of increase in the transmission opportunities in accordance with the transmission power. Therefore, it is possible to further enhance the effect of improving the communication efficiency by optimizing the transmission opportunities.

In addition, the first threshold value changes at the proportion that is different from that of the change in the second threshold value. Therefore, it is possible to increase the transmission opportunities as the transmission power becomes lower by deciding the proportion of the change, that is, the aforementioned coefficient y2 such that the difference between the first threshold value and the second threshold value increases as the transmission power becomes lower, for example. Therefore, it is possible to more effectively cause the communication efficiency to be improved without disturbing other communication by the transmission opportunities further increasing as the distance by which the eclectic waves reach decreases.

In addition, at least one of the upper limit and the lower limit of the first threshold value differs from at least one of the upper limit raid the lower limit of the second threshold value, respectively. Therefore, CCA_SD is generally lower in order to suppress communication collision. Meanwhile, the concern that the communication collides is reduced at the upper limit since the transmission power becomes relatively low. Further, the OBSS signal generally tends not to disturb the communication as compared with its own BSS signal as described above. Thus, it is possible to further increase the transmission opportunities while suppressing other communication from being disturbed by the threshold value being set such that the upper limit of the first threshold value differs from that of the second threshold value.

2. Second Embodiment (Vacant Channel Detection Threshold Value in Accordance with Transmission Power)

Next, a second embodiment of the present disclosure will be described.

2-1. Outline of System

Figure 10:
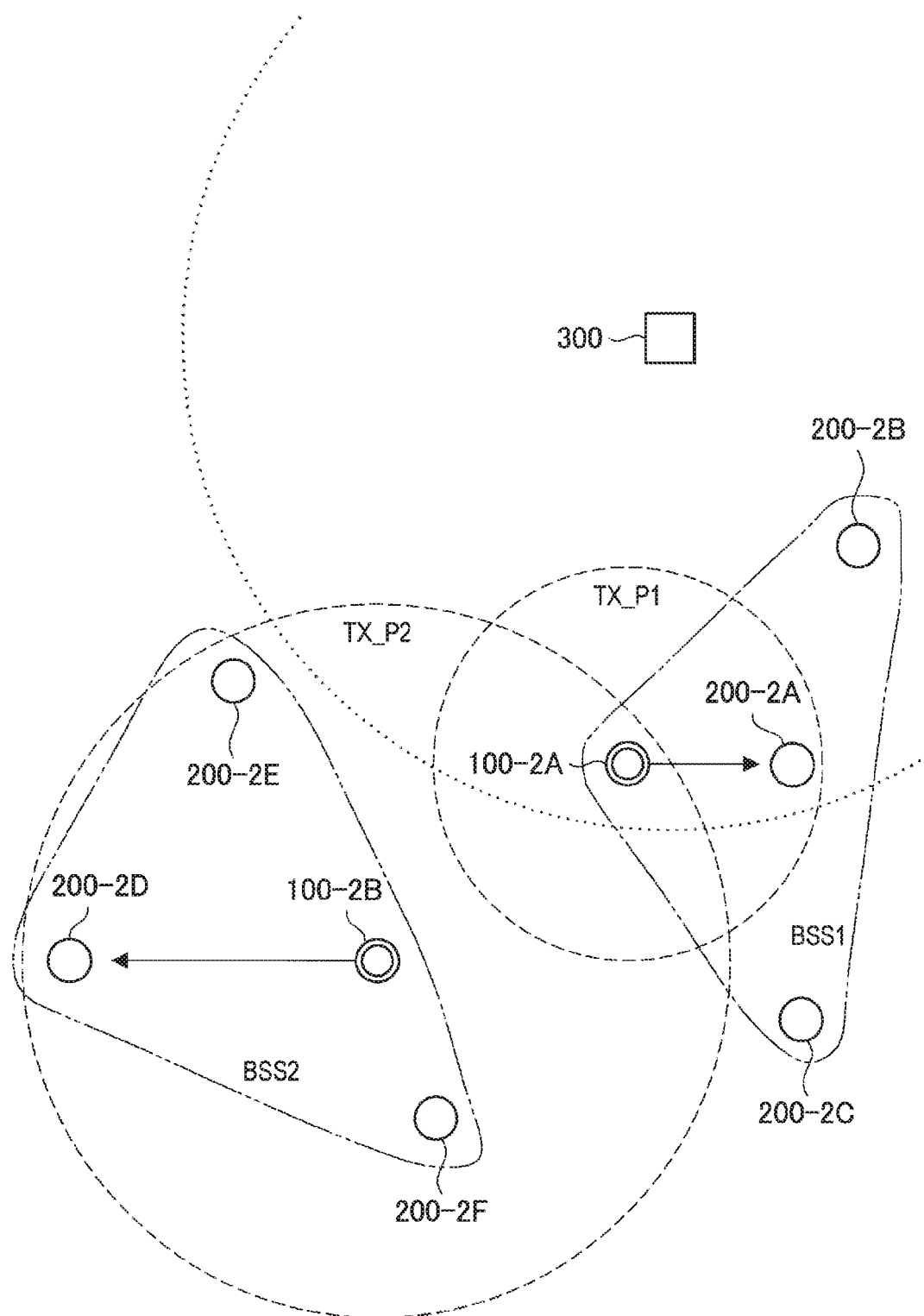
FIG. 10 is a diagram for describing an outline of a wireless communication system according to a second embodiment of the present disclosure.

First, an outline of a wireless communication system according to the second embodiment of the present disclosure will be described with, reference to FIG. 10. FIG. 10 is a diagram for describing art outline of the wireless communication system according to the second embodiment of the present disclosure.

The wireless communication system according to the embodiment includes a wireless communication device 100-2 (200-2) that has a vacant channel detecting function, a TPC function, and an advanced spatial multiplexing function. Specifically, the wireless communication device 100-2

(200-2) performs vacant channel detection processing, and if it is determined that a channel is vacant, the wireless communication device 100-2 (200-2) transmits a signal with transmission power of a lower limit with which the signal is received in the wireless communication device that is a destination of the signal. Note that the wireless communication device 100-2 (200-2) does not perform processing related to ignoring of the OBSS signal unlike the first embodiment.

Here, a case in which a device 300 (hereinafter, also referred to as an MW device) that releases energy (electric waves that do not transport a signal) is present in the surroundings of the wireless communication system will be considered. In this case, the wireless communication device that has detected the energy released by the MW device waits for transmission until the release of energy ends. This is for not to affect the operations of the MW device 300. Therefore, there is a concern that transmission opportunities for the wireless communication device decrease if the MW device 300 is present in the surroundings.

For example, the wireless communication system according to the embodiment includes an AP 100-2A and STAs 200-2A, 200-2B, and 200-2C that belongs to a BSS 1 and an AP 100-2B and STAs 200-2D, 200-2E, and 200-2F that belong to a BSS 2 as illustrated in FIG. 10. The AP 100-2A sets transmission power to TX_P1 and transmits a signal to the STA 200-2A as a destination. In addition, the AP 100-2B sets the transmission power to TX_P2 that is higher than TX_P1 and transmits a signal to the STA 200-2D as a destination. Further, it is assumed that the MW deuce 300 is present in the surroundings of the wireless communication system.

If energy is fed from the MW device 300 as illustrated in FIG. 10 before the AP 100-2A transmits a signal, the AP 100-2A that has detected the energy gives up transmitting a signal in the related art. Note that if a signal is transmitted from the AP 100-2B earlier, the AP 100-2 that has detected the signal still gives up transmitting the signal in the related art. Therefore, transmission opportunities for the AP 100-2A decrease due to the release of the energy from the MW device 300 in the related art.

However, there is also a case in which the MW device 300 is not affected even when energy is released from the MW device 300. For example, a signal transmitted by the AP 100-2A is transmitted with transmission power with which it is only necessary for the signal to reach only the STA 200-2A by the TPC function and the advanced spatial multiplexing function. Therefore, it is considered that no electric waves reach the MW device 300 or electric waves that reach the MW device 300 have also sufficiently been attenuated. The same applies to signals transmitted from other wireless communication devices.

Thus, according to the second embodiment of the present disclosure, the wireless communication device 100-2 (200-2) sets a detection level (CCA_ED) of energy and a detection level (CCA_SD) of a signal on the basis of the transmission power and controls transmission on the basis of these levels.

2-2. Detailed Functions of Device

Next, detailed functions of the wireless communication device 100-2 (200-2) according to the embodiment will be described. Note that only the wireless communication device 100-2 will be described in a manner similar to that in the first embodiment. In addition, descriptions of functions that are substantially the same as the functions according to the first embodiment will be omitted.

(F. Setting of CCA_SD and CCA_ED)

Figure 11:
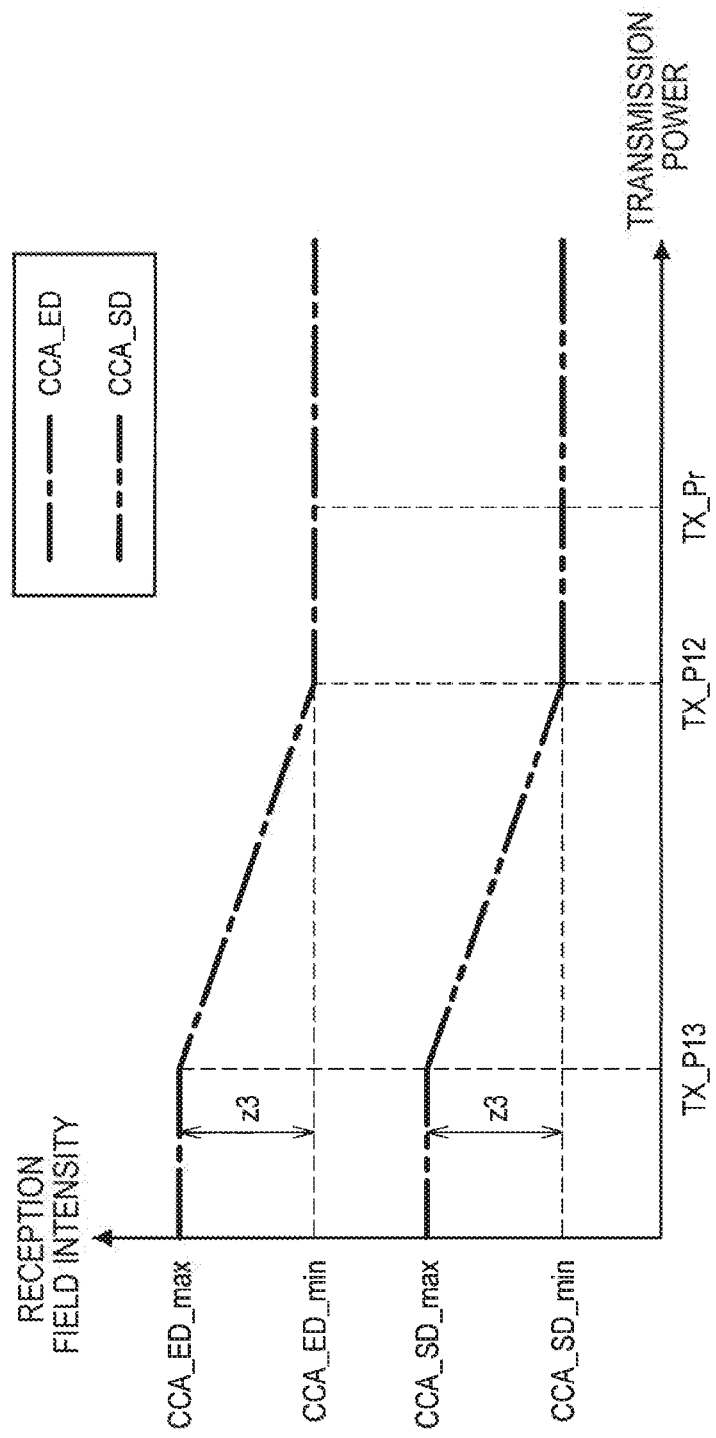
FIG. 11 is a diagram illustrating relationships between the respective threshold values and transmission power set in the wireless communication device according to the embodiment.

The wireless communication device 100-2 sets the detection level of the signal and the detection level of the energy on the basis of transmission power. Specifically, the control unit 120 sets CCA_SD and CCA_ED on the basis of transmission power. Further, details of the setting of CCA_SD and CCA_ED will be described with reference to FIG. 11. FIG. 11 is a diagram illustrating relationships between the respective threshold values and transmission power set by the wireless communication device 100-2 according to the embodiment.

The control unit 120 causes CCA_SD and CCA_ED to change in accordance with a change in the transmission power. In a case in which the transmission power is set to a value between TX_P12 and TX_P13 as illustrated in FIG. 11, for example, the control unit 120 sets CCA_SD and CCA_ED such that CCA_SD and CCA_ED increase in accordance with a decrease in the transmission power. Note that the amount of change in CCA_SD, that is, a difference between CCA_SD, and CCA_SD$_{max}$ is managed by a coefficient z3. The same applies to CCA_ED.

In addition, the control unit 120 causes CCA_SD to change such that the difference between CCA_SD and CCA_ED is fixed relative to the change in the transmission power. For example, the control unit 120 sets CCA_SD and CCA_ED such that CCA_SD and CCA_ED change at the same proportions as those of CCA_ED and CCA_SD.

In addition, the control unit 120 sets CCA_SD to be equal to or less than CCA_ED. For example, the control unit 120 sets CCA_SD such that CCA_SD is equal to or less than CCA_ED in the entire range in which the transmission power can be set as illustrated in FIG. 11.

Note that the amount of change in CCA_SD, that is, the coefficient z3 may be decided on the basis of communication environment information. Specifically, the coefficient z3 may be decided on the basis of the aforementioned information related to communication errors or information that changes in accordance with the number of other wireless communication devices that operate differently from the wireless communication device 100-2. The same applies to CCA_ED.

In addition, the control unit 120 provides limit values of CCA_SD and CCA_ED. Specifically, the control unit 120 provides limit values such that the upper limit and the lower limit of CCA_SD are different from the upper limit and the lower limit of CCA_ED, respectively. CCA_SD$_{max}$ and CCA_ED$_{max}$ are set to different values, and CCA_SD$_{min}$ and CCA_ED$_{min}$ are set to different values as illustrated in FIG. 11, for example.

(G. Channel Access Control)

The wireless communication device 100-2 performs channel access control on the basis of the set threshold values. More specifically, in a case in which energy or a signal has been detected in a vacant channel checking period, the control unit 120 controls transmission of a signal on the basis of a level of the detected energy or signal and the respective threshold values. Further, the channel access control according to the embodiment will be described in detail with reference to FIG. 11.

In the vacant channel checking period, the control unit 120 determines whether or not energy has been detected with the reception field intensity of equal to or greater than CCA_ED. For example, the wireless communication unit 130 determines whether or not the reception field intensity of the energy detected in the DIFS period is equal to or greater than CCA_ED as illustrated in FIG. 11. In a case in which it is determined that the reception field intensity of the detected energy is equal to or greater than CCA_ED, the control unit 120 regards the channel as being in the BUSY state, causes the wireless communication unit 1300 to wait for transmission, and newly sets a DIFS after the waiting.

In addition, the control unit 120 determines whether or not the signal has been detected with the reception field intensity of less than CCA_SD. If energy is received, for example, the wireless communication unit 130 performs processing of detecting a preamble that is transmitted by the energy, that is, electric waves. Then, if the preamble is detected, the control unit 120 determines whether or not the reception held intensity of the preamble is less than CCA_SD as illustrated in FIG. 11. Note that if it is determined that the reception field intensity of the detected preamble is less than CCA_SD, the control unit 120 causes the wireless communication unit 130 to transmit a signal.

If the energy has been detected with the reception field intensity of less than CCA_ED and equal to or greater than CCA_SD, the control unit 120 controls the transmission in accordance with whether or not the preamble has been detected. In a case in which the preamble has been detected with the reception field intensity of less than CCA_ED and equal to or greater than CCA_SD, for example, the control unit 120 sets a NAV period. In addition, in a case in which the energy has been detected with the reception field intensity of less than CCA_ED and equal to or greater than CCA_SD while no preamble has been detected, a signal is transmitted as long as the NAV period is not ongoing.

Hereinafter, behaviors of the wireless communication device 100-2 in the aforementioned channel access control will be summarized.
1. In a case in which a signal has been detected with the reception field intensity of less than CCA_SD, a signal is transmitted.
2. In a case in which a signal has been detected with the reception field intensity of equal to or greater than CCA_SD, signal transmission is suppressed.
3. In a case in which only energy has been detected with the reception field intensity of less than CCA_ED, a signal is transmitted.
4. In a case in which energy has been detected with the reception field intensity of equal to or greater than CCA_ED, signal transmission is suppressed.

2-3. Processing Performed by Device

Figure 12:
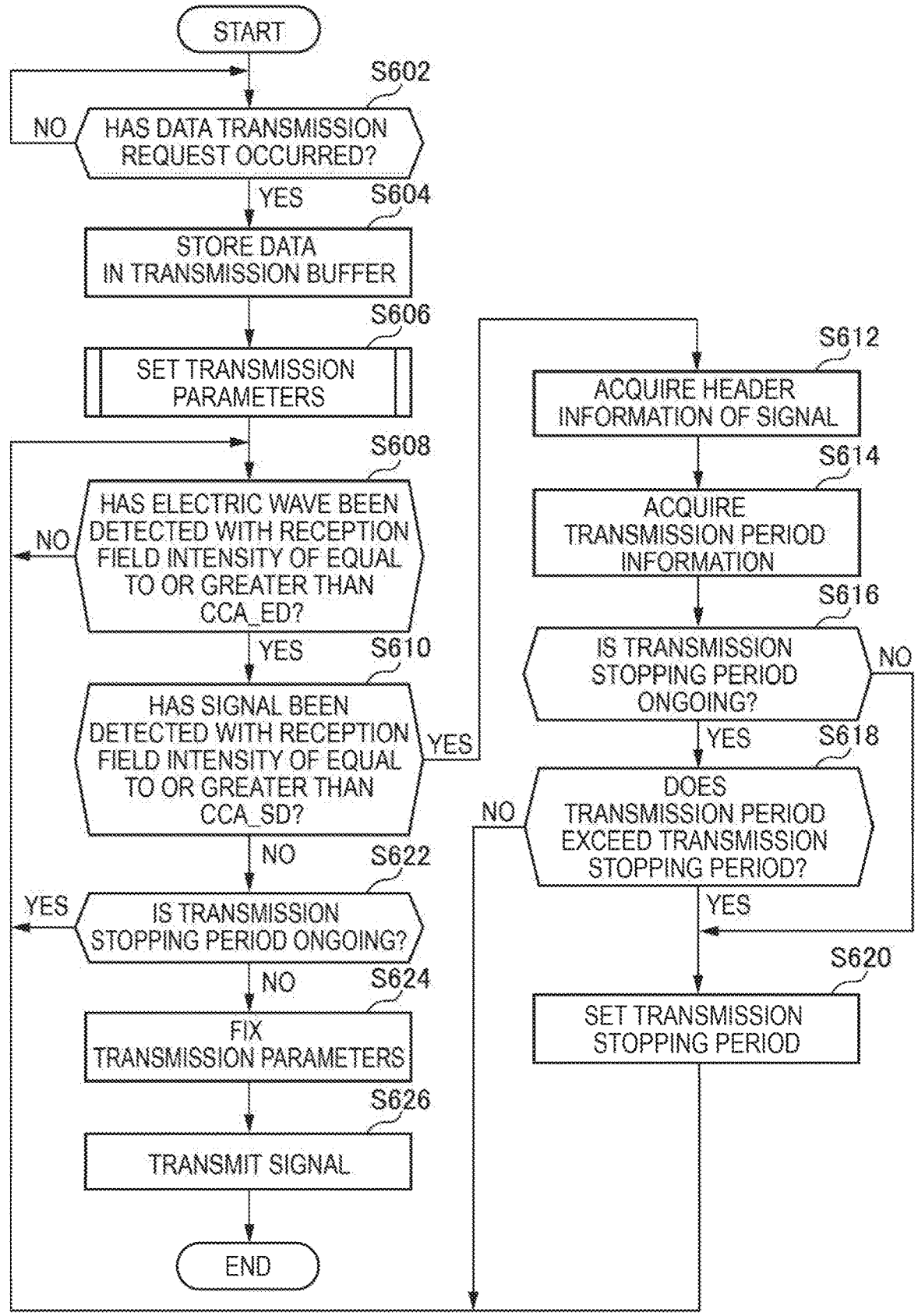
FIG. 12 is a flowchart conceptually illustrating an example of overall processing performed by the wireless communication device according to the embodiment.

Next, processing performed fey the wireless communication device 100-2 according to the embodiment will be described. Note that description of processing that is substantially the same as the processing according to the first embodiment will be omitted.
(Overall Processing)
First, overall processing performed by the wireless communication device 100-2 will be described with reference to FIG. 12. FIG. 12 is a flowchart conceptually illustrating an example of overall processing performed by the wireless communication device 100-2 according to the embodiment.

The wireless communication device 100-2 determines whether or not a data transmission request has occurred (Step S602), and if it is determined that the data transmission request has occurred, the wireless communication device 100-2 stores data in the transmission butler 112 (Step S604).

Next, tire wireless communication device 100-2 sets transmission parameters (Step S606). Details will be described later.

Next, the wireless communication device 100-2 determines whether or not energy has been detected with the reception field intensity of equal to or greater than CCA_ED (Step S608), and if it is determined that the energy has been detected with the reception field intensity of equal to or greater than CCA_ED, the wireless communication device 100-2 determines whether or not a signal has been detected with the reception field intensity of equal to or greater than CCA_SD (Step S610).

If it is determined the signal has been detected with the reception field intensity of equal to or greater than CCA_SD, the wireless communication device 100-2 acquires header information of the signal (Step S612) and acquires transmission period information (Step S614).

Next, the wireless communication device 100-2 determines whether or not a transmission stopping period is ongoing (Step S616), and if it is determined that the transmission stopping period is ongoing, the wireless communication device 100-2 determines whether or not a transmission period exceeds the transmission stopping period (Step S618). If it is determined that the transmission period exceeds the transmission stopping period, the wireless communication device 100-2 sets the transmission stopping period (Step S620).

In addition, if it is determined that the signal has been detected with the reception field intensity of less than CCA_SD in Step S610, the wireless communication device 100-2 determines whether or not the transmission stopping period is ongoing (Step S622), and if the transmission period is not being stopped, the wireless communication device 100-2 causes transmission parameters to be fixed (Step S624). Then, the wireless communication device 100-2 transmits a signal (Step S626).
(Transmission Parameter Setting Processing)

Figure 13:
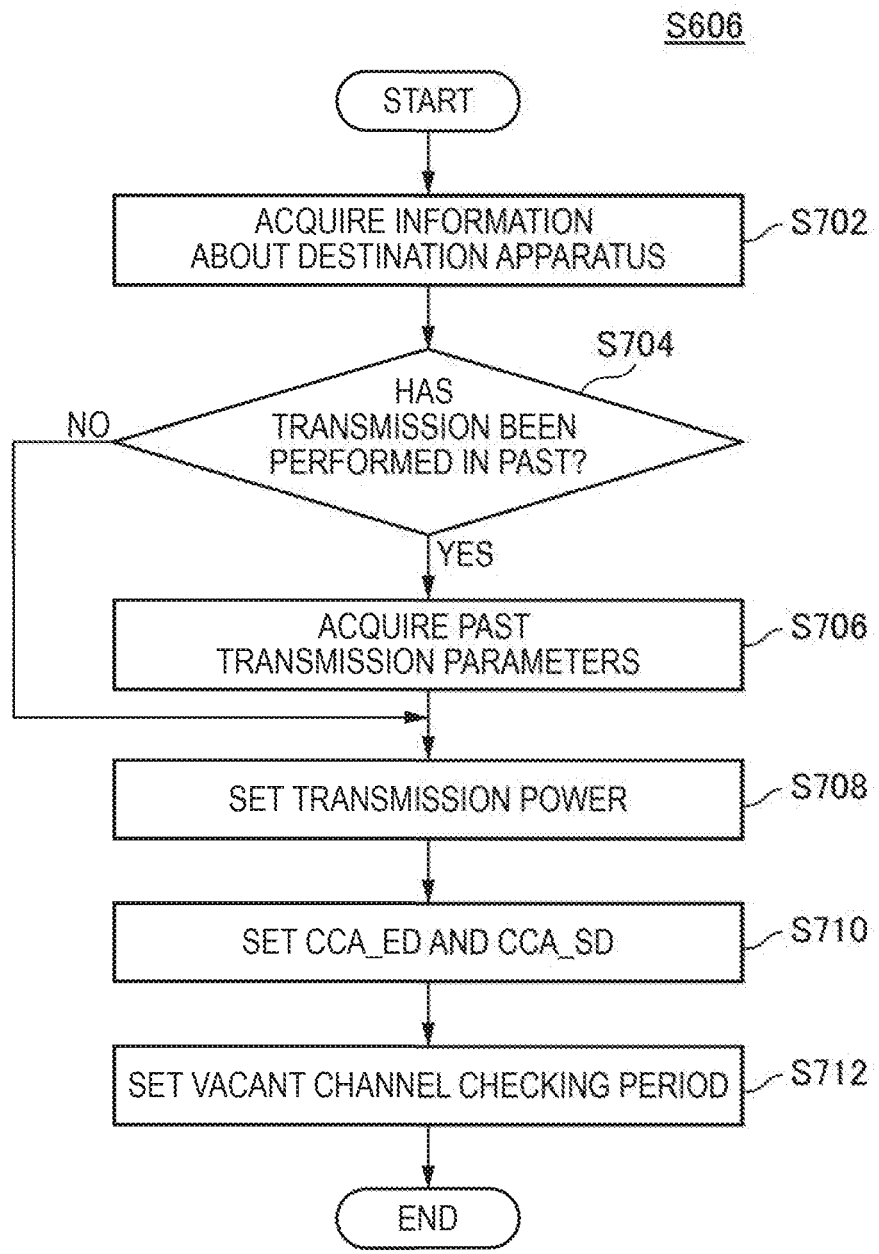
FIG. 13 is a flowchart conceptually illustrating an example of processing of setting transmission parameters, which is performed by the wireless communication device according to the embodiment.

Next, transmission parameter setting processing performed by the wireless communication device 100-2 will be described with reference to FIG. 13. FIG. 13 is a flowchart conceptually illustrating an example of the transmission parameter setting processing performed by the wireless communication device 100-2 according to the embodiment.

The wireless communication device 100-2 acquires information about a wireless communication device that is a destination (Step S702) and determines whether or not the wireless communication device 100-2 has transmitted a signal to the wireless communication device in the past (Step S704). Specifically, the control unit 120 determines whether or not a signal has been transmitted to the wireless communication device that is the destination of the signal, that is, data from a communication history in the past.

If it is determined that the wireless communication device 100-2 has transmitted a signal to the wireless communication device that is the destination in the past, the wireless communication device 100-2 acquires past transmission parameters (Step S706). Specifically, if it is determined that transmission to the wireless communication device that is the destination has been performed in the past, the control unit 120 acquires parameters in the transmission in the past, for example, transmission power, communication link quality information, and the like.

Next the wireless communication device 100-2 sets transmission power (Step S708) and sets CCA_ED and CCA_SD on the basis of the transmission power (Step S709). Then, the wireless communication device 100-2 sets a vacant channel checking period (Step S712).

2-4. Summary of Second Embodiment

According to the second embodiment of the present disclosure, the wireless communication device 100-2 (200-

2) receives a signal and transmits a signal on the basis of a detection level related to electric waves, which is set on the basis of the transmission power, as described above.

In the related art the aforementioned detection level (for example, CCA_ED or CCA_SD) is fixedly set. Therefore, since the detection level does not change even if the transmission power is lowered by using the TPC, the transmission opportunities for other wireless communication devices increases while its own transmission opportunities may decrease.

In contrast, according to the embodiment, it is possible to also cause its own transmission opportunities to increase while increasing the transmission opportunities for other wireless communication devices by the detection level being also changed in accordance with the transmission power. Therefore, it is possible to cause the communication efficiency to be improved without disturbing other communication.

2-5. Modification Example

The second embodiment of the present disclosure has been described above. Note that the embodiment is not limited to the aforementioned example. Hereinafter, a modification example of the embodiment will be described.

Figure 14:
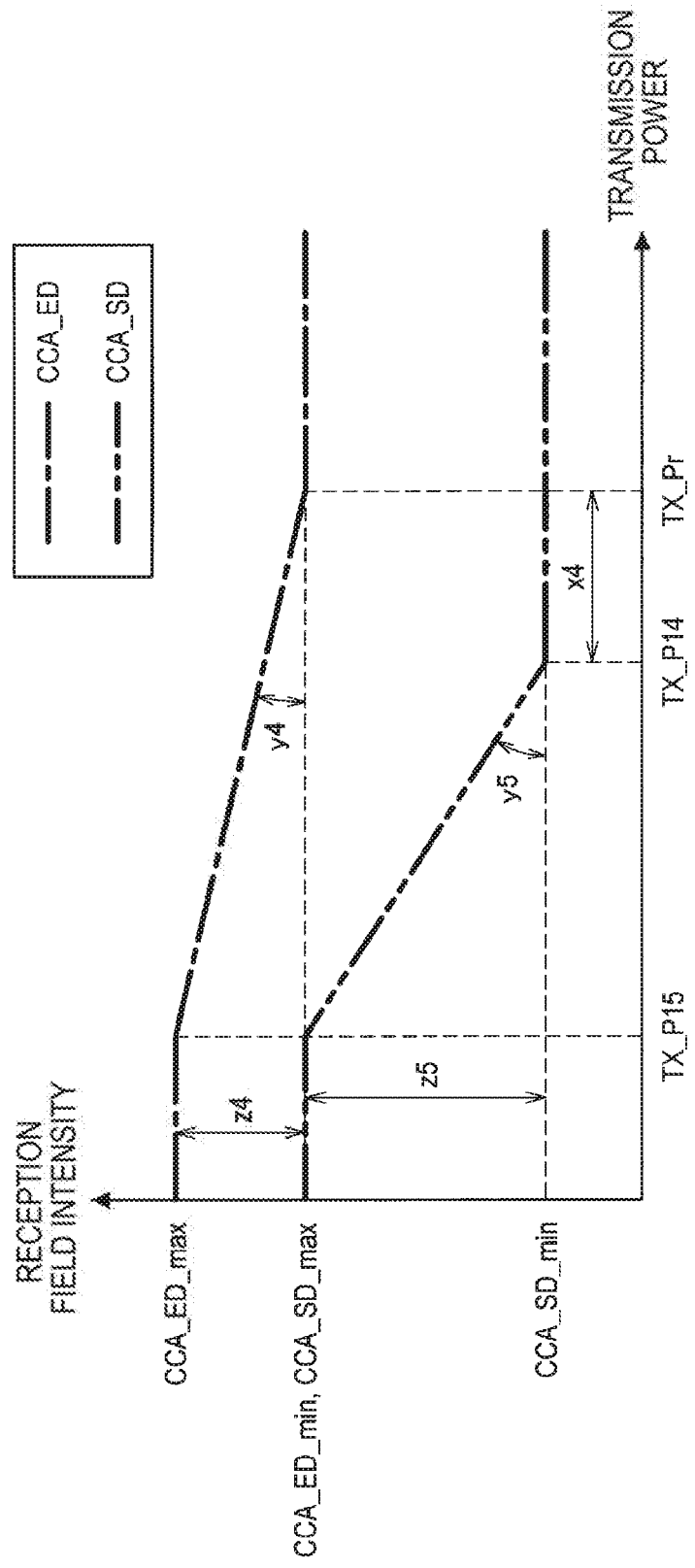
FIG. 14 is a diagram illustrating relationships between the respective threshold values and transmission power set in a wireless communication device according to a modification example of the embodiment.

In the modification example of the embodiment, a signal detection level may be such a level that a difference between the signal detection level and the energy detection level is variable relative to a change in the transmission power. Specifically, the signal detection level changes at a proportion that is different from that of the change in the energy detection level. For example, the control unit 120 causes CCA_SD and CCA_ED to change at different proportions relative to the change in the transmission power. Further, processing according to the modification example will be described in detail with reference to FIG. 14. FIG. 14 is a diagram illustrating relationships between the respective threshold values and transmission power set by the wireless communication device 100-2 according to the modification example of the embodiment.

The control unit 120 causes CCA_SD and CCA_ED to change such that the difference between CCA_SD and CCA_ED is variable relative to the change in the transmission power. In a case in which the transmission power is set to a value between TX_Pr and TX_P15 as illustrated in FIG. 14, for example, the control unit 120 causes CCA_ED to change at a proportion decided by a coefficient y4. In addition, in a case in which the transmission power is set to a value between TX_P14 and TX_P15, the control unit 120 causes CCA_SD to change at a proportion, which is determined by a coefficient y5, which is different from that of CCA_ED.

In addition, the control unit 120 sets CCA_ED and CCA_SD such that transmission power with which change starts differs between CCA_ED and CCA_SD. For example, the control unit 120 sets CCA_ED such that CCA_ED starts to increase from TX_Pr and stops increasing at TX_P15 as illustrated in FIG. 14. In contrast, the control unit 120 sets CCA_SD such that CCA_SD starts to increase from transmission power TX_P14 that is lower than TX_Pr by the coefficient x4 and stops increasing at TX_P15.

In addition, the control unit 120 sets CCA_ED and CCA_SD such that the amounts of change in CCA_ED and CCA_SD differ. As illustrated in FIG. 14, for example, a difference between CCA_ED$_{min}$ and CCA_ED$_{max}$ is managed by a coefficient z4, and a difference between CCA_SD$_{min}$ and CCA_SD$_{max}$ is managed by a coefficient z5 that is different from the coefficient z4.

According to the modification example of the embodiment, the signal detection level is such a level that the difference between the signal detection level and the energy detection level is variable relative to the change in the transmission power as described above. Therefore, it is possible to change the degree of increase in the transmission opportunities in accordance with the transmission power. Therefore, it is possible to further enhance the effect of improving the communication efficiency by optimizing the transmission opportunities.

3. Application Example

The technology according to the present disclosure can be applied to various products. For example, the wireless communication device 100 (200) (hereinafter, also simply referred to as wireless communication device 100) may be realized as mobile terminals such as smartphones, tablet personal computers (PCs), notebook PCs, portable game terminals, or digital cameras, fixed-type terminals such as television receivers, printers, digital scanners, or network storages, or car-mounted terminals such as car navigation devices, in addition, the wireless communication device 100 may be realized as terminals that perform machine to machine (M2M) communication (also referred to as machine type communication (MTC) terminals) such as smart meters, vending machines, remotely controlled monitoring devices, or point of sale (POS) terminals. Furthermore, the wireless communication device 100 may be wireless communication modules mounted in such terminals (for example, integrated circuit modules configured by one die).

On the other hand, for example, the wireless communication device 100 may be realized as a wireless LAN access point (also referred to as a wireless base station) which has a rooter function or does not have a router function. The wireless communication device 100 may be realized as a mobile wireless LAN router. The wireless communication device 100 may also be a wireless communication module (for example, an integrated circuit module configured with one die) mounted on such devices.

3-1. First Application Example

Figure 15:
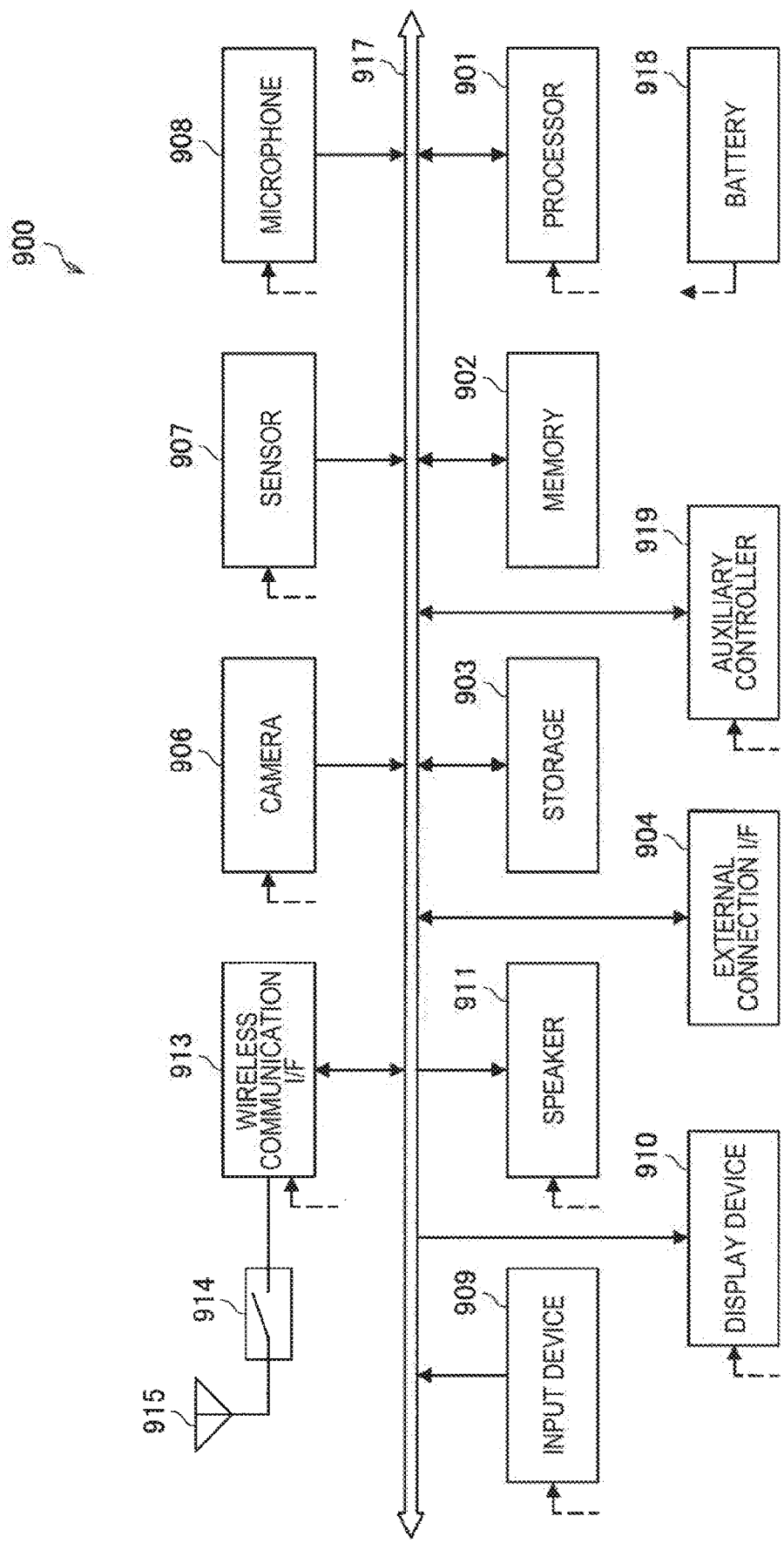
FIG. 15 is a block diagram illustrating an example of a schematic configuration of a smartphone.

FIG. 15 is a block diagram illustrating an example of a schematic configuration of a smartphone 900 to which the technology of the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on chip (SoC) and controls functions of an application laser and other layers of the smartphone 900. The memory 902 includes random access memory (RAM) and read only memory (ROM), and stores data and programs executed by the processor 901. The storage 903 can include a storage medium such as a semiconductor memory or a hard disk. The external connection interface 904 is an interface for connecting an externally attachable device such as a memory card or a universal serial bus (USB) device to the smartphone 900.

The camera 906 has an image sensor, for example, a charge coupled device (CCD) or a complementary metal oxide semiconductor (CMOS), to generate captured images. The sensor 907 can include a sensor group including, for example, a positioning sensor, a gyro sensor a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like, to receive operation or information input from a user. The display device 910 has a screen such as a liquid crystal display (LCD), or an organic light emitting diode (OLED) display to display output images of the smartphone 900. The speaker 911 converts audio signals output from the smart phone 900 into sounds.

The wireless communication interface 913 supports one or more wireless LAN standards of IEEE 802.11a, 11b, 11g, 11n, 11ac, and 11ad, to establish wireless communication. The wireless communication interface 913 can communicate with another device via a wireless LAN access point, in an infrastructure mode. In addition, the wireless communication interface 913 can directly communicate with another device in a direct communication mode such as an ad hoc mode or Wi-Fi Direct (registered trademark). Note that, Wi-Fi Direct is different from the ad hoc mode. One of two terminals operates as an access point, and communication is performed directly between the terminals. The wireless communication interface 913 can typically include a baseband processor, a radio frequency (RF) circuit, a power amplifier, and the like. The wireless communication interface 913 may be a one-chip module on which a memory that stores a communication control program, a processor that executes the program, and a relevant circuit are integrated. The wireless communication interface 913 may support another kind of wireless communication scheme such as a cellular communication scheme, a near-field communication scheme, or a proximity wireless communication scheme in addition to the wireless LAN scheme. The antenna switch 914 switches a connection destination of the antenna 915 among a plurality of circuits (for example, circuits tor different wireless communication schemes) included in the wireless communication interface 913. The antenna 915 has a single or a plurality of antenna elements (for example, a plurality of antenna elements constituting a MIMO antenna), and is used for transmission and reception of wireless signals through the wireless communication interface 913.

Note that the smartphone 900 may include a plurality of antennas (for example, antennas for a wireless LAN or antennas for a proximity wireless communication scheme, or the like), without being limited to the example of FIG. 15. In this case, the antenna switch 914 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 with each other. The battery 918 supplies electric power to each of the blocks of the smartphone 900 illustrated in FIG. 15 via power supply lines partially indicated by dashed lines in the drawing. The auxiliary controller 919 causes, for example, necessary minimum functions of the smartphone 900 to be operated in a sleep mode.

In the smartphone 900 illustrated in FIG. 15, the data processing unit 110, the control unit 120, and the wireless communication unit 130 described above with reference to FIG. 3 may be mounted on a wireless communication interface 913. In addition, at least a part of these functions may be mounted on a processor 901 or an auxiliary controller 919. For example, the control unit 120 sets a reception determination level of a signal on the basis of transmission power and sets a detection level related to detection of electric waves in association with the set reception determination level. Then, the control unit 120 causes the wireless communication unit 130 to transmit a signal on the basis of the set detection level. Therefore, it is possible to suppress disturbance of communication of devices in the surroundings of the smartphone 900 by causing transmission opportunities for the smartphone 900 to decrease as the transmission power increases. In addition, it is possible to cause the communication efficiency to be improved by causing the transmission opportunities for the smartphone 900 to increase as the transmission power decreases. Therefore, it is possible to cause the efficiency of communication performed by the smartphone 900 to be improved without disturbing communication performed by wireless communication devices in the surroundings.

Note that the smartphone 900 may operate as a wireless access point (software AP) as the processor 901 executes the function of an access point at an application level. In addition, the wireless communication interface 913 may have the function of a wireless access point.

3-2. Second Application Example

Figure 16:
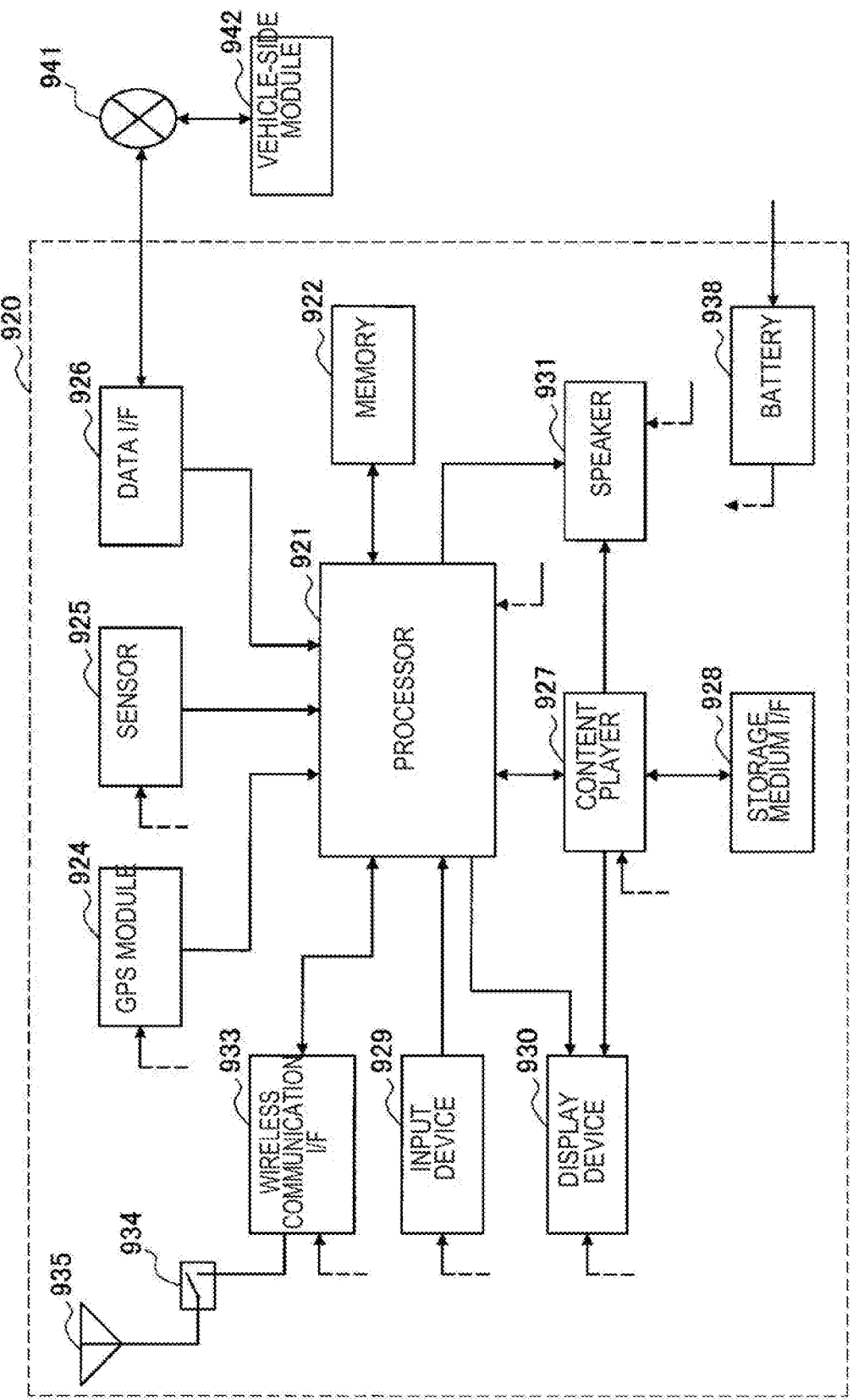
FIG. 16 is a block diagram illustrating an example of a schematic configuration of a car navigation device.

FIG. 16 is a block diagram illustrating an example of a schematic configuration of a car navigation device 920 to which the technology of the present disclosure can be applied. The car navigation device 920 includes a processor 921, a memory 922, a Global Positioning System (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation device 920. The memory 922 includes RAM and ROM storing data and programs executed by the processor 921.

The GPS module 924 measures a position of the car navigation device 920 (for example, latitude, longitude, and altitude) using GPS signals received from a GPS satellite. The sensor 925 can include a sensor group including, for example, a gyro sensor, a geomagnetic sensor, a barometric sensor, and the like. The data interface 926 is connected with an in-vehicle network 941 via, for example, a terminal (not illustrated) to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive operation or information input from a user. The display device 930 has a screen such as an LCD or an OLED display to display images of the navigation, function or reproduced content. The speaker 931 outputs sounds of the navigation function or reproduced content.

The wireless communication interface 933 supports one or more wireless LAN standards of IEEE 802.11a, 11b, 11g, 11n, 11ac, 11ad, and the like to execute wireless communication. The wireless communication interface 933 can communicate with another device via a wireless LAN access point in the infrastructure mode. In addition, the wireless communication interface 933 can directly communicate with another device in a direct communication mode such as an ad hoc mode or Wi-Fi Direct. The wireless communication interface 933 can typically have a baseband processor, an RF circuit, a power amplifier, and the like. The wireless communication interface 933 may be a one-chip module on which a memory that stores a communication control program, a processor that executes the program, and a relevant circuit are integrated. The wireless communication interface 933 may support another kind of wireless communication scheme such as a near-field communication scheme, a proximity wireless communication scheme, or the cellular communication scheme in addition to the wireless LAN scheme. The antenna switch 934 switches a connection destination of the antenna 935 among a plurality of circuits included in the wireless communication interface 933. The antenna 935 has a single or a plurality of antenna elements and is used for transmission and reception of wireless signals from and to the wireless communication interface 933.

Note that the car navigation device 920 may include a plurality of antennas, without being limited to the example of FIG. 16. In this case, the antenna switch 934 may be omitted from the configuration of the car navigation device 920.

The battery 938 supplies electric power to each of the blocks of the car navigation device 920 illustrated in FIG. 16 via power supply lines partially indicated by dashed lines in the drawing. In addition, the battery 938 accumulates electric power supplied from the vehicle side.

In the car navigation device 920 illustrated in FIG. 16, the data processing unit 110, the control unit 120, and the wireless communication unit 130 described above with reference to FIG. 3 may be mounted on a wireless communication interface 933. In addition, at least a part of these functions may be mounted on a processor 921. For example, the control unit 120 sets a reception determination level of a signal on the basis of transmission power and sets a detection level related to detection of electric waves in association with the set reception determination level. Then, the control unit 120 causes the wireless communication unit 130 to transmit a signal on the basis of the set detection level. Therefore, it is possible to suppress disturbance of communication of devices in the surroundings of the car navigation device 920 by causing transmission opportunities for the car navigation device 920 to decrease as the transmission power increases. In addition, it is possible to cause the communication efficiency to be improved by causing the transmission opportunities for the car navigation device 920 to increase as the transmission power decreases. Therefore, it is possible to cause the efficiency of communication performed by the car navigation device 920 to be improved without disturbing communication performed by wireless communication devices in the surroundings.

In addition, the wireless communication interface 933 may provide wireless communication to a terminal that a user in a vehicle has. At that time, it is possible to cause the efficiency of communication to be improved by disturbing communication of different wireless communication devices other than the car navigation device 920 and the terminal that the user has by the car navigation device 920 operating as described above, for example.

Further, the technology of the present disclosure may be realized as an in-vehicle system (or a vehicle) 940 including one or more blocks of the above-described car navigation device 920, the in-vehicle network 941, and a vehicle-side module 942. The vehicle-side module 942 generates vehicle-side data such as a vehicle speed, the number of engine rotations, or failure information and outputs the generated data to the in-vehicle network 941.

3-3. Third Application Example

FIG. 17 is a block diagram illustrating an example of a schematic configuration of a wireless access point 950 to which the technology of the present disclosure can be applied. The wireless access point includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP) and operates various functions (for example, access limitation, routing, encryption, a fire wall, and log management) of the Internet Protocol (IP) layer and higher layers of the wireless access point 950. The memory 952 includes RAM and ROM and stores a program executed by the controller 951 and various kinds of control data (for example, a terminal list, a routing table, an encryption key, security settings, and a log).

The input device 954 includes, for example, a button or a switch, and receives operation performed by a user. The display device 955 includes an LED lamp and displays an operation status of the wireless access point 950.

The network interface 957 is a wired communication interface that connects the wireless access point 950 with a wired communication network 958. The network interface 957 may include a plurality of connection terminals. The wired communication network 958 may be a LAN such as Ethernet (registered trademark) or may be a wide area network (WAN).

The wireless communication interface 963 supports one or more wireless LAN standards of IEEE 802.11a, 11b, 11g, 11n, 11ac, 11ad, and the like to supply wireless connection to a nearby terminal as an access point. The wireless communication interface 963 can typically include a baseband processor, an RF circuit, and a power amplifier. The wireless communication interface 963 may be a one-chip module in which memory storing a communication control program, a processor executing the program, and relevant circuits are integrated. The antenna switch 964 switches a connection destination of the antenna 965 among a plurality of circuits included in the wireless communication interface 963. The antenna 965 includes one antenna element or a plurality of antenna elements and is used to transmit and receive a wireless signal through the wireless communication interface 963.

In the wireless access point 950 illustrated in FIG. 17, the data processing unit 110, the control unit 120, and the wireless communication unit 130 described above with reference to FIG. 3 may be mounted on a wireless communication interface 963. In addition, at least a part of these functions may be mounted on a controller 951. For example, the control unit 120 sets a reception determination level of a signal on the basis of transmission power and sets a detection level related to detection of electric waves in association with the set reception determination level. Then, the control unit 120 causes the wireless communication unit 130 to transmit a signal on the basis of the set detection level. Therefore, it is possible to suppress disturbance of communication of devices in the surroundings of the wireless access point 950 by causing transmission opportunities for the wireless access point 950 to decrease as the transmission power increases. In addition, it is possible to cause the communication efficiency to be improved by causing the transmission opportunities for the wireless access point 950 to increase as the transmission power decreases. Therefore, it is possible to cause the efficiency of communication performed by the wireless access point 950 to be improved without disturbing communication performed by wireless communication devices in the surroundings.

4. Conclusion

According to the first embodiment of the present disclosure, it is possible to control how easy a signal or electric waves can be detected in accordance with how easy the signal can be received by the detection level used for controlling whether or not to transmit a signal being set in association with the reception determination level that varies in accordance with the transmission power. For example, it is possible to suppress the concern that the transmission opportunities decrease as the transmission power increases and that other communication is disturbed by a signal transmitted by the wireless communication device 100-1 (200-1). In addition, the transmission opportunities increase as the transmission power decreases, and it is possible to improve the efficiency of communication performed by the wireless communication device 100-1 (200-1), for example. Therefore, it is possible to cause the efficiency of communication to be improved without disturbing other communication.

In addition, according to the second embodiment of the present disclosure, it is possible to cause its own transmission opportunities to increase while causing the transmission opportunities for other wireless communication devices to increase by the detection level being also changed in accordance with the transmission power. Therefore, it is possible to cause the communication efficiency to be improved without disturbing other communication.

The preferred embodiment(s) of the present disclosure has/have been described above with reference to the accompanying drawings, whilst the present disclosure is not limned to the above examples. A person skilled in the art may find various alterations and modifications within the scope of the appended claims, and it should be understood that they will naturally come under the technical scope of the present disclosure.

For example, although OBSS_PD, CCA_ED, and CCA_SD (hereinafter, also referred to as the respective threshold values) are set one by one in the aforementioned embodiments, the present technology is not limited to such an example. For example, the respective threshold values may be set for each channel width. Also, the respective threshold values may be set for each channel. Further, the threshold values of CCA may be set in accordance with parameters related to CCA for a primary channel or a secondary channel in a case in which channel bonding as defined in IEE 802.11AC is utilized.

Also, although the example in which the aforementioned respective threshold values linearly change in a partial section has been described in the aforementioned embodiments, the respective threshold values may change in a stepwise manner or may change in a curved line manner.

In addition, although the example in which CCA_SD and CCA_ED are set in association with OBSS_PD or an example in which CCA_SD and CCA_ED are set on the basis of the transmission power has been described in the aforementioned embodiments, CCA_SD may be set in association with CCA_ED while CCA_ED may be set in association with CCA_SD.

In addition, although the example in which the upper limits and the lower limits of the aforementioned respective threshold values are fixed values has been described in the aforementioned embodiments, the upper limits and the lower limits of the respective threshold values may be variable. Further, the aforementioned respective coefficients may be positive values or negative values.

Further, the effects described in this specification are merely illustrative or exemplified effects, and are not limitative. That is, with or in the place of the above effects, the technology according to the present disclosure may achieve other effects that are clear to those skilled in the art from the description of this specification.

Further, steps illustrated in the flowcharts of the above embodiment include not only processes which are chronologically performed in accordance with the described order but also processes which are not necessarily chronologically performed but performed in parallel or individually as well. Further, it is needless to say that even in steps which are processed chronologically, the order can be appropriately changed depending on circumstances.

In addition, it is also possible to produce a computer program for causing hardware incorporated in a wireless communication device 100 (200) to exhibit functions equivalent to those of the respective functional configurations of the aforementioned wireless communication device 100 (200). In addition, a storage medium that stores the computer program therein is also provided.

Additionally, the present technology may also be configured as below.

(1)

A wireless communication device including:

a reception unit that receives a signal; and a transmission unit that transmits a signal on a basis of a first threshold value set in association with a second threshold value, in which the first threshold value includes a detection level related to an electric wave in the wireless communication device, and the second threshold value includes a reception determination level of a signal detected by the wireless communication device, which is set on a basis of transmission power of the wireless communication device.

(2)

The wireless communication device according to (1) in which the second threshold value includes reception determination level of a signal transmitted from a second wireless communication device that belongs to a second wireless communication network that is different from a first wireless communication network to which the wireless communication device belongs.

(3)

The wireless communication device according to (1) of (2), in which the transmission power is controlled in accordance with, a wireless communication device that is a destination of a signal.

(4)

The wireless communication device according to any one of (1) to (3), in which the first threshold value includes a threshold value that changes in accordance with a change in the second threshold value.

(5)

The wireless communication device according to (4), in which the first threshold value includes a threshold value for which a difference between the first threshold value and the second threshold value is fixed relative to a change in the transmission power.

(6)
The wireless communication device according to (4) or (5), in which the first threshold value includes a threshold value for which a difference between the first threshold value and the second threshold value is variable relative to a change in the transmission power.

(7)
The wireless communication device according to (6), in which the first threshold value includes a threshold value that changes in a proportion that is different from a proportion of a change in the second threshold value.

(8)
The wireless communication device according to any one of (5) to (7), in which the first threshold value includes a threshold value that starts to change with the transmission power that is different from the transmission power with which the second threshold value starts to change.

(9)
The wireless communication device according to any one of (5) to (8), in which the difference between the first threshold value and the second threshold value is decided on a basis of communication environment information.

(10)
The wireless communication device according to (9), in which the communication environment information includes information related to a communication error or information that changes in accordance with the number of other wireless communication devices that operate differently from the wireless communication device.

(11)
The wireless communication device according to any one of (1) to (10), in which an upper limit and a lower limit of the first threshold value coincide with an upper limit and a lower limit of the second threshold value, respectively.

(12)
The wireless communication device according to any one of (1) to (10), in which at least one of an upper limit and a lower limit of the first threshold value is different from at least one of an upper limit and a lower limit of the second threshold value, respectively.

(13)
The wireless communication device according to any one of (1) to (12), in which the first threshold value includes a detection level of an electric wave.

(14)
The wireless communication deuce according to (13), in which the detection level of the electric wave includes a value that is equal to or greater than the second threshold value.

(15)
The wireless communication device according to any one of (1) to (14), in which the first threshold value includes a signal detection level at which a signal transported by an electric wave is detected.

(16)
The wireless communication device according to (15), in which the signal detection level includes a value that is equal to or less than the second threshold value.

(17)
The wireless communication device according to any one of (13) to (16), in which the transmission unit transmits a signal in a case in which reception field intensity is equal to or greater than a signal detection level at which a signal transported by an electric wave is detected and is lower than the reception determination level.

(18)
A wireless communication method including, by using a processor:
receiving a signal by a wireless communication device; and
transmitting a signal on a basis of a first threshold value set in association with a second threshold value,
in which the first threshold value includes a detection level related to an electric wave in the wireless communication device, and
the second threshold value includes a reception determination level of a signal detected by the wireless communication device, which is set on a basis of transmission power of the wireless communication device.

REFERENCE SIGNS LIST

100, 200 wireless communication device
110 data processing unit
120 control unit
130 wireless communication unit

The invention claimed is:
1. A wireless communication device comprising:
reception circuitry that receives a signal; and
transmission circuitry that transmits a signal on a basis of a first threshold value set in association with a second threshold value,
wherein the first threshold value includes a detection level related to an electric wave detected by the wireless communication device, and
the second threshold value includes a reception determination level of a signal detected by the wireless communication device, the reception determination level is used to set a transmission power of the wireless communication device;
wherein the detected signal, which includes the reception determination level, also includes information related to quality of a communication link between the wireless communication device and a destination wireless device; and
control circuitry that sets transmission power of the wireless communication device from amongst a plurality of possible transmission powers, in accordance with the information related to quality of the communication link between the wireless communication device and the destination wireless device;
wherein the control circuitry sets the first threshold value to be equal to or less than the second threshold value in an entire range of the plurality of possible transmission powers;
wherein the first threshold value is a clear channel assessment signal detected (CCA_SD) threshold and the second threshold is an overlapping basic service set packet detection (OBSS_PD) threshold; and
wherein a coefficient relating to the transmission power is set on a basis of a communication error rate, and a difference between the first threshold value and the second threshold value is set on a basis of the coefficient relating to the transmission power.

2. The wireless communication device according to claim 1, wherein the second threshold value includes a reception determination level of a signal transmitted from a second wireless communication device that belongs to a second wireless communication network that is different from a first wireless communication network to which the wireless communication device belongs.

3. The wireless communication device according to claim 1, Therein the first threshold value includes a threshold value that changes in accordance with a change in the second threshold value.

4. The wireless communication device according to claim 3, wherein the first threshold value includes a threshold value for which the difference between the first threshold value and the second threshold value is fixed relative to a charge in the transmission power.

5. The wireless communication device according to claim 3, wherein the first threshold value includes a threshold value for which the difference between the first threshold value and the second threshold value is variable relative to a change in the transmission power.

6. The wireless communication device according to claim 5, wherein the first threshold value includes a threshold value that changes in a proportion that is different from a proportion of a change in the second threshold value.

7. The wireless communication device according to claim 4, wherein the first threshold value includes a threshold value that starts to change with the transmission power that is different from the transmission power with which the second threshold value starts to change.

8. The wireless communication device according to claim 1, wherein an upper limit and a lower limit of the first threshold value coincide with an upper limit and a lower limit of the second threshold value, respectively.

9. The wireless communication device according to claim 1, wherein at least one of an upper limit and a lower limit of the first threshold value is different from at least one of an upper limit and a lower limit of the second threshold value, respectively.

10. The wireless communication device according to claim 1, wherein the first threshold value includes a detection level of an electric wave.

11. The wireless communication device according to claim 10, wherein the detection level of the electric wave includes a value that is equal to or greater than the second threshold value.

12. The wireless communication device according to claim 1, wherein the first threshold value includes a signal detection level at which a signal transported by an electric wave is detected.

13. The wireless communication device according to claim 12, wherein the signal detection level includes a value that is equal to or less than the second threshold value.

14. The wireless communication device according to claim 10, wherein the transmission circuitry transmits a signal in a case in which reception field intensity is equal to or greater than a signal detection level at which a signal transported by an electric wave is detected and is lower than the reception determination level.

15. A wireless communication method comprising, by using a processor:
receiving a signal by a wireless communication device; and
transmitting a signal on a basis of a first threshold value set in association with a second threshold value,
wherein the first threshold value includes a detection level related to an electric wave detected by the wireless communication device, and
the second threshold value includes a reception determination level of a signal detected by the wireless communication device, using the reception determination level to set a transmission power of the wireless communication device;
wherein the detected signal, which includes the reception determination level, also includes information related to quality of a communication link between the wireless communication device and a destination wireless device; and
setting the transmission power of the wireless communication device from amongst a plurality of possible transmission powers, in accordance with the information related to quality of the communication link between the wireless communication device and the destination wireless device;
wherein the control circuitry sets the first threshold value to be equal to or less than the second threshold value in an entire range of the plurality of possible transmission powers;
wherein the first threshold value is a clear channel assessment signal detected (CCA_SD) threshold and the second threshold is an overlapping basic service set packet detection (OBSS_PD) threshold; and
wherein a coefficient relating to the transmission power is set on a basis of a communication error rate, and a difference between the first threshold value and the second threshold value is set on a basis of the coefficient relating to the transmission power.

16. A wireless communication device comprising:
reception circuitry that receives a signal; and
transmission circuitry that transmits a signal on a basis of a first threshold value set in association with a second threshold value,
wherein the first threshold value includes a detection level related to an electric wave detected by the wireless communication device, and
the second threshold value includes a reception determination level of a signal detected by the wireless communication device, the reception determination level is used to set a transmission power of the wireless communication device;
wherein the detected signal, which includes the reception determination level, also includes information related to quality of a communication link between the wireless communication device and a destination wireless device; and
control circuitry that sets transmission power of the wireless communication device from amongst a plurality of possible transmission powers, in accordance with the information related to quality of the communication link between the wireless communication device and the destination wireless device;
wherein the first threshold value is a clear channel assessment energy detection (CCA_ED) threshold and the second threshold is an overlapping basic service set packet detection (OBSS_PD) threshold; and
wherein a coefficient relating to the transmission power is set on a basis of a communication error rate, and a difference between the first threshold value and the second threshold value is set on a basis of the coefficient relating to the transmission power.

17. The wireless communication device according to claim 16, wherein the control circuitry sets the first threshold value to be equal to or greater than the second threshold value in an entire range of the plurality of possible transmission powers.

* * * * *